US007327358B2

(12) United States Patent
Tajiri et al.

(10) Patent No.: US 7,327,358 B2
(45) Date of Patent: Feb. 5, 2008

(54) CROSS-TALK CORRECTION METHOD FOR ELECTRO-OPTICAL APPARATUS, CORRECTION CIRCUIT THEREOF, ELECTRO-OPTICAL APPARATUS, AND ELECTRONIC APPARATUS

(75) Inventors: Kenichi Tajiri, Shiojiri (JP); Satoshi Yatabe, Shiojiri (JP)

(73) Assignee: Seiko Epson Corporation (JP)

( * ) Notice: Subject to any disclaimer, the term of this patent is extended or adjusted under 35 U.S.C. 154(b) by 701 days.

(21) Appl. No.: 10/931,811

(22) Filed: Sep. 1, 2004

(65) Prior Publication Data

US 2005/0088105 A1 Apr. 28, 2005

(30) Foreign Application Priority Data

Sep. 2, 2003 (JP) ............................. 2003-310602

(51) Int. Cl.
*G06F 3/038* (2006.01)
*G09G 5/00* (2006.01)
*G09G 3/36* (2006.01)

(52) U.S. Cl. ........................... 345/208; 345/94; 345/98

(58) Field of Classification Search ............ 345/94–96, 345/98–100, 204, 208
See application file for complete search history.

(56) References Cited

U.S. PATENT DOCUMENTS 5,440,322 A * 8/1995 Prince et al. ................. 345/58
5,818,402 A * 10/1998 Park et al. ..................... 345/58
5,828,354 A * 10/1998 Ebihara ........................ 345/58
6,049,319 A * 4/2000 Sakamoto et al. ............ 345/94
6,061,044 A * 5/2000 Ohno et al. .................... 345/95
6,522,318 B1 * 2/2003 Kumagawa et al. .......... 345/98
7,034,816 B2 * 4/2006 Yatabe ........................ 345/213

FOREIGN PATENT DOCUMENTS

JP 11-052922 2/1999
JP 2000-056292 2/2000

* cited by examiner

*Primary Examiner*—Amr A. Awad
*Assistant Examiner*—Steven E. Holton
(74) *Attorney, Agent, or Firm*—Harness, Dickey & Pierce, P.L.C.

(57) ABSTRACT

An electro-optical apparatus is provided which corrects a voltage applied to a pixel with high accuracy. An electro-optical apparatus includes a correction circuit. When, for example, a positive-polarity selection voltage $+V_S$ is applied to a scanning line during the second-half period of one horizontal scanning period, the correction circuit detects a spike resulting from voltage switching from a voltage $-V_D/2$ to a voltage $+V_D/2$ on the data lines, determines whether the level of the detected spike is a threshold level or more, and if a determination is made that the level of the detected spike is the threshold level or more, adds a pulse with the same polarity as that of the detected spike to a selection-voltage supply line in the second-half period following the first-half period.

10 Claims, 16 Drawing Sheets

CROSS-TALK CORRECTION METHOD FOR ELECTRO-OPTICAL APPARATUS, CORRECTION CIRCUIT THEREOF, ELECTRO-OPTICAL APPARATUS, AND ELECTRONIC APPARATUS

RELATED APPLICATIONS

This application claims priority to Japanese Patent Application No. 2003-310602 filed Sep. 2, 2003 which is hereby expressly incorporated by reference herein in its entirety.

BACKGROUND

1. Technical Field of the Invention

The present invention relates to a cross-talk correction method for an electro-optical apparatus, a correction circuit thereof, an electro-optical apparatus, and an electronic apparatus for preventing the occurrence of so-called horizontal cross-talk.

2. Description of the Related Art

In an electro-optical apparatus for performing display based on an electro-optical change in electro-optic material such as liquid crystal, there is a problem of horizontal cross-talk, which causes a difference in display quality in the horizontal (row) direction. Horizontal cross-talk probably occurs because a spike resulting from the switching of voltage on data lines (segment electrodes) causes the RMS value of the voltage applied to pixels to fluctuate.

Technologies for preventing the occurrence of such horizontal cross-talk include, for example, the two technologies described below. One technology corrects the voltage applied to pixels by reducing the pulse width of a scan signal according to the number of segment electrodes for which the voltage is switched. (For example, see Japanese Unexamined Patent Application Publication No. 11-52922. (Refer to, for example, FIGS. 1 and 2 and Paragraph 0027.). This technology is referred to as Technology A.) The other technology adds a correction signal to, for example, a data signal after distortion (spike) of a driving signal is detected. (For example, see Japanese Unexamined Patent Application Publication No. 2000-56292. (Refer to, for example, FIG. 1 and Paragraph 0017.). This technology is referred to as Technology B.)

In Technology A described above, however, a spike is not detected, and hence the correction accuracy of the applied voltage is not sufficiently high. Furthermore, in Technology B described above, although a spike is detected, a correction signal is generated via, for example, a filter and an amplifying circuit, and hence some amount of delay in operation occurs. For this reason, a correction signal for canceling out a spike is added immediately after the spike, which causes the voltage applied to pixels to change significantly. Consequently, the RMS value of the voltage is not corrected with sufficiently high accuracy, particularly when pixels have capacitance, as with a liquid crystal device.

The present invention is proposed in view of the problems described above. An object of the present invention is to provide a cross-talk correction method for an electro-optical apparatus, a correction circuit thereof, an electro-optical apparatus, and an electronic apparatus which can correct the RMS value of a voltage applied to pixels with high accuracy in order to prevent the occurrence of horizontal cross-talk.

SUMMARY

In order to achieve the above-described object, a cross-talk correction circuit according to the present invention is associated with an electro-optical apparatus which includes pixels provided at intersections of a plurality of scanning lines and a plurality of data lines; a scanning-line drive circuit which sequentially selects the scanning lines every one horizontal scanning period and applies a selection voltage to a selected scanning line over a second-half period of the one horizontal scanning period; and a data-line drive circuit which applies a non-lighting voltage to one data line over a period according to the gradation of a pixel, the period being included in a first-half period in one horizontal scanning period, applies a lighting voltage to the one data line over the rest of the period, applies a lighting voltage to the one data line over a period in the second-half period according to the gradation of the pixel, and applies a non-lighting voltage to the one data line over the rest of the period. The cross-talk correction circuit comprises a detection circuit which detects a spike resulting from switching from one of the lighting voltage and the non-lighting voltage to the other in a first-half period in one horizontal scanning period; a determination circuit which determines whether or not the level of a detected spike is a threshold level or more; and an addition circuit which adds a pulse with the same polarity as that of the detected spike to the selection voltage in a second-half period following the first-half period if a determination is made by the determination circuit that the level of the detected spike is the threshold level or more.

When the voltage for a certain number of data lines is switched from one of the lighting (ON) voltage and the non-lighting (OFF) voltage to the other with a certain timing in the first-half period of one horizontal scanning period, the voltage for the same number of data lines is switched from the other from the lighting voltage and the non-lighting voltage to the one with the same timing in the second-half period in which a selection voltage is applied. As a result, a spike with substantially the same level as and with an opposite polarity to those of the spike in the first-half period occurs in the second-half period. The correction circuit according to the present invention suppresses horizontal cross-talk based on this fact. More specifically, the correction circuit according to the present invention detects a spike resulting from voltage switching in the first-half period and, if a determination is made that the level of the spike is the threshold level or more, adds a spike with the same polarity as that of the detected spike in the second-half period, thus canceling out a spike with the opposite polarity occurring in the second-half period in which a selection voltage is applied.

The lighting voltage and the non-lighting voltage according to the present invention are defined as follows. That is, while a scanning line is selected as a result of a selection voltage being applied to the scanning line, a data signal voltage which is applied to data lines and which has a polarity opposite to that of the selection voltage applied to the scanning line is referred to as the lighting voltage. Similarly, a data signal voltage which is applied to data lines and which has the same polarity as that of the selection voltage applied to the scanning line is referred to as the non-lighting voltage. Furthermore, the positive polarity is defined as a voltage higher than the intermediate voltage between the lighting voltage and the non-lighting voltage of a data signal, and the negative polarity is defined as a voltage lower than the intermediate voltage.

In the cross-talk correction circuit, the addition circuit preferably adds the pulse with a timing when the other of the lighting voltage and the non-lighting voltage is switched to the one in the second-half period. This enables a spike with the opposite polarity in the second-half period to be cancelled out with high accuracy by adding a pulse with the same polarity as that of the spike in the first-half period.

In the cross-talk correction circuit, the data-line drive circuit, in relation to one data line, preferably makes a period from the start of the first-half period to the switching to the other of the lighting voltage and the non-lighting voltage substantially equal to a period from the start of the second-half period following the first half-period to the switching to the one of the lighting voltage and the non-lighting voltage, and the addition circuit preferably includes a delay circuit which delays a spike whose level is the threshold level or more by half the one horizontal scanning period and outputs the delayed spike as the pulse. This simplifies the structure.

If the electro-optical apparatus is basically AC-driven as with a liquid crystal device, the scanning-line drive circuit preferably carries out polarity inversion of the selection voltage with respect to a voltage substantially intermediate between the lighting voltage and the non-lighting voltage, and preferably includes two sets of the detection circuit, the determination circuit, and the addition circuit, one of the two sets being used for a positive polarity and the other of the two sets being used for a negative polarity. This enables a spike on scanning lines to be canceled out in both the positive and negative polarities in AC driving.

In the cross-talk correction circuit, the detection circuit preferably includes a first capacitor having one end thereof connected to a predetermined voltage supply line. According to this aspect, a spike resulting from voltage switching in the first-half period can be detected with a simple structure.

In the cross-talk correction circuit, the scanning-line drive circuit preferably includes a switch which connects a power line for supplying the selection voltage to a selected scan electrode in the second-half period, and the addition circuit preferably includes a second capacitor having one end thereof connected to the power line. According to this aspect, a spike with the same polarity as that of the spike in the first-half period can be added to the selection voltage in the second-half period with a simple structure.

The present invention applies not only to the cross-talk correction circuit, but also to a cross-talk correction method.

In order to achieve the above-described object, an electro-optical apparatus according to the present invention includes pixels provided at intersections of a plurality of scanning lines and a plurality of data lines; a scanning-line drive circuit which sequentially selects the scanning lines every one horizontal scanning period and applies a selection voltage to a selected scanning line over a second-half period of the one horizontal scanning period; a data-line drive circuit which applies a non-lighting voltage to one data line over a period according to the gradation of a pixel, the period being included in a first-half period in one horizontal scanning period, applies a lighting voltage to the one data line over the rest of the period, applies a lighting voltage to the one data line over a period in the second-half period according to the gradation of the pixel, and applies a non-lighting voltage to the one data line over the rest of the period; a detection circuit which detects a spike resulting from switching from one of the lighting voltage and the non-lighting voltage to the other in a first-half period in one horizontal scanning period; a determination circuit which determines whether or not the level of a detected spike is a threshold level or more; and an addition circuit which adds a pulse with the same polarity as that of the detected spike to the selection voltage in a second-half period following the first-half period if a determination is made by the determination circuit that the level of the detected spike is the threshold level or more. According to this electro-optical apparatus, an opposite-polarity spike occurring in the second half period can be cancelled out in the same manner as with the correction circuit.

In the electro-optical apparatus, each of the pixels preferably includes a two-terminal switching device having one end thereof connected to one of the corresponding scanning line and the corresponding data line, and an electro-optical capacitance having an electro-optic material held between the other of the corresponding scanning line and the corresponding data line and a pixel electrode connected to the other end of the two-terminal switching device. Such a two-terminal switching device is more advantageous than a three-terminal switching device in that the two-terminal switching device is in principle free from short circuit between wires and enables a simpler manufacturing process.

Furthermore, the two-terminal switching device is preferably has a structure of a conductor, an insulator, and a conductor. The two-terminal switching device with this structure allows either of the two conductors to be used as a scanning line or a data line, as-is, and the insulator to be produced by oxidizing the conductors.

An electronic apparatus according to the present invention includes the above-described electro-optical apparatus as a display. This allows the electronic apparatus to perform high-quality display without cross-talk. Examples of such an electronic apparatus are described below.

According to the present invention, the RMS value of the voltage applied to pixels can be corrected with high accuracy in order to prevent the occurrence of horizontal cross-talk.

DETAILED DESCRIPTION

Figure 1:
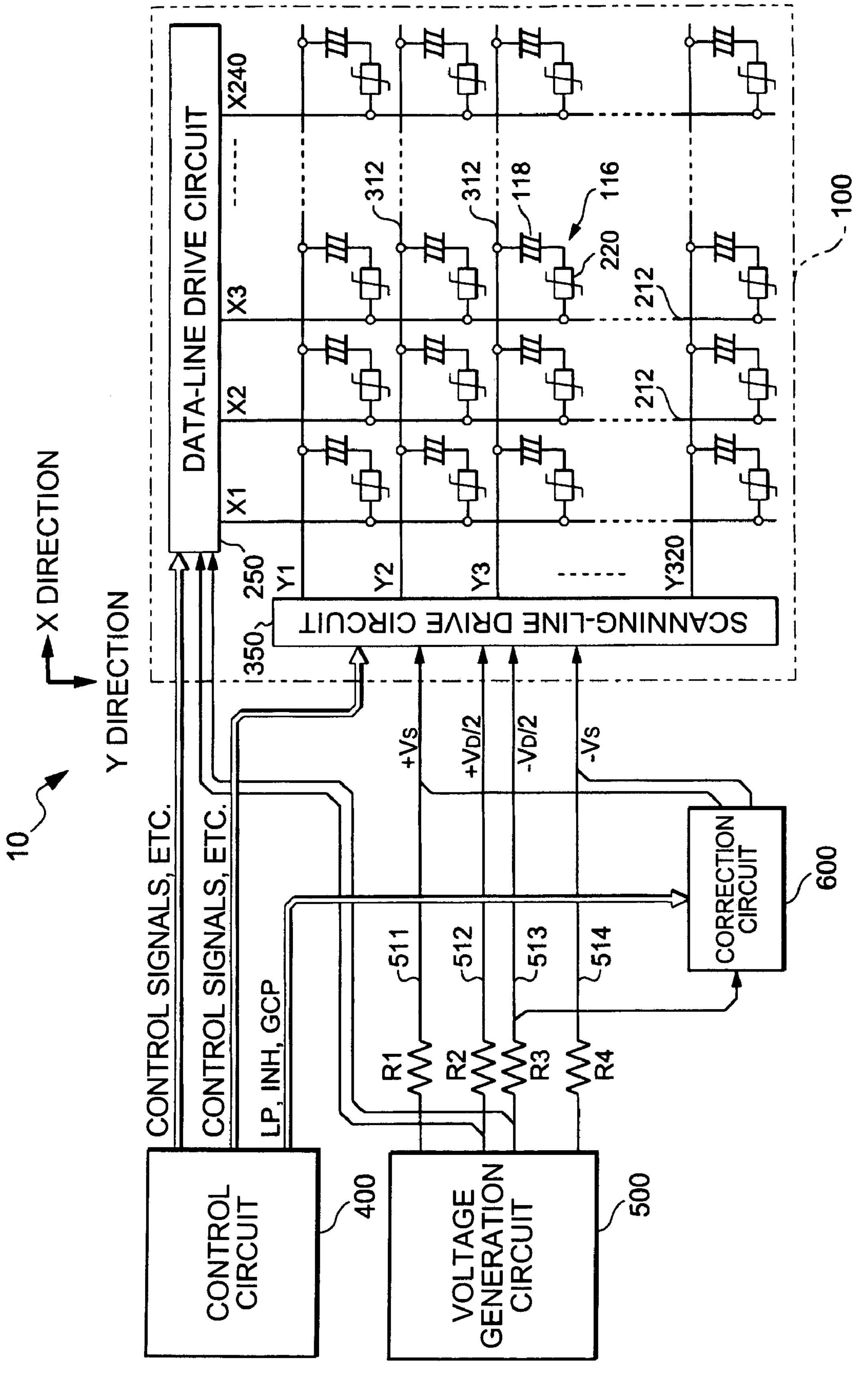
FIG. 1 is a block diagram showing the structure of an electro-optical apparatus according to an embodiment of the present invention.

Embodiments according to the present invention will now be described with reference to the drawings. FIG. 1 is a block diagram showing the structure of an electro-optical apparatus according to an embodiment of the present invention.

As shown in this figure, an electro-optical apparatus 10 includes a liquid crystal panel 100, a control circuit 400, a voltage generation circuit 500, and a correction circuit 600. Of these components, the liquid crystal panel 100 includes a plurality of data lines (segment electrodes) 212 extending in the column (Y) direction and a plurality of scanning lines (common electrodes) 312 extending in the row (X) direction. Furthermore, a pixel 116 is formed at each of the intersections of the data lines 212 and the scanning lines 312. Here, each pixel 116 is defined by a series connection between a liquid crystal capacitance 118 and a TFD (Thin Film Diode) 220, which is an example of a two-terminal switching element. As described later, the liquid crystal capacitance 118 is constructed such that liquid crystal, which is an example of an electro-optic material, is held between the corresponding scanning line 312, functioning as a counter electrode, and a rectangular pixel electrode.

In this embodiment, a description is given by way of example of a display apparatus with a matrix of 320 vertically arranged rows×240 horizontally arranged columns, i.e., a matrix made of 320 scanning lines 312 in total and 240 data lines 212 in total for convenience in description. The present invention, however, is not limited to the display apparatus described in this example.

A scanning-line drive circuit 350 supplies scan signals Y1, Y2, Y3, . . . , Y320 to the first, second, third, . . . , 320-th scanning lines 312, respectively. In detail, the scanning-line drive circuit 350 selects one of the 320 scanning lines 312 at a time, as described later, and supplies the selected scanning line 312 with a selection voltage and the other scanning lines 312 with a deselection voltage.

Furthermore, a data-line drive circuit 250 provides the pixels 116 disposed in the scanning line 312 selected by the scanning-line drive circuit 350 with data signals X1, X2, X3, . . . , X240 according to the display content (gradation) via the data lines 212 in the first-column, second-column, third-column, . . . , 240-th column, respectively. Details of the data-line drive circuit 250 and the scanning-line drive circuit 350 will be described below.

On the other hand, the control circuit 400 supplies the data-line drive circuit 250 with, for example, various control signals and clock signals for horizontal scanning of the liquid crystal panel 100, and supplies the scanning-line drive circuit 350 with, for example, various control signals and clock signals for vertical scanning of the liquid crystal panel 100. Furthermore, the control circuit 400 supplies 3-bit gradation data Dn specifying the gradation of pixels 116 in 8 stages from “0” to “7” in synchronization with vertical scanning and horizontal scanning.

Here, this embodiment assumes that the 3-bit gradation data Dn exhibits the brightest white display with (000), the luminance decreases as the 3-bit value increases, and the 3-bit gradation data Dn exhibits the darkest black display when it reaches (111). Furthermore, a normally white mode where the liquid crystal panel 100 exhibits white display with no voltage applied is assumed.

As described above, a lighting voltage refers to the voltage of a data signal with an inverse polarity with respect to the selection voltage. It should be noted, therefore, that applying a lighting voltage to a pixel causes the pixel to become dark in a normally white mode.

The voltage generation circuit 500 generates voltages $\pm V_S$ and voltages $\pm V_D/2$ used for the liquid crystal panel 100. From among these voltages, the voltages $\pm V_S$ are used as selection voltages of the scan signal. The voltage $+V_S$ is supplied to the scanning-line drive circuit 350 via a resistor R1 and a supply line 511, and the voltage $-V_S$ is supplied to the scanning-line drive circuit 350 via a resistor R4 and a supply line 514. The voltages $\pm V_D/2$ are deselection voltages of the scan signal. The voltage $+V_D/2$ is supplied to the scanning-line drive circuit 350 via a resistor R2 and a supply line 512, and the voltage $-V_D/2$ is supplied to the scanning-line drive circuit 350 via a resistor R3 and a supply line 513. In this embodiment, the voltages $\pm V_D/2$ also serve as data voltages of the data signal, and therefore each of $\pm V_D/2$ is also supplied to the data-line drive circuit 250. Furthermore, the voltage $-V_D/2$ is also supplied to the correction circuit 600, which will be described below for convenience in description.

Figure 2:
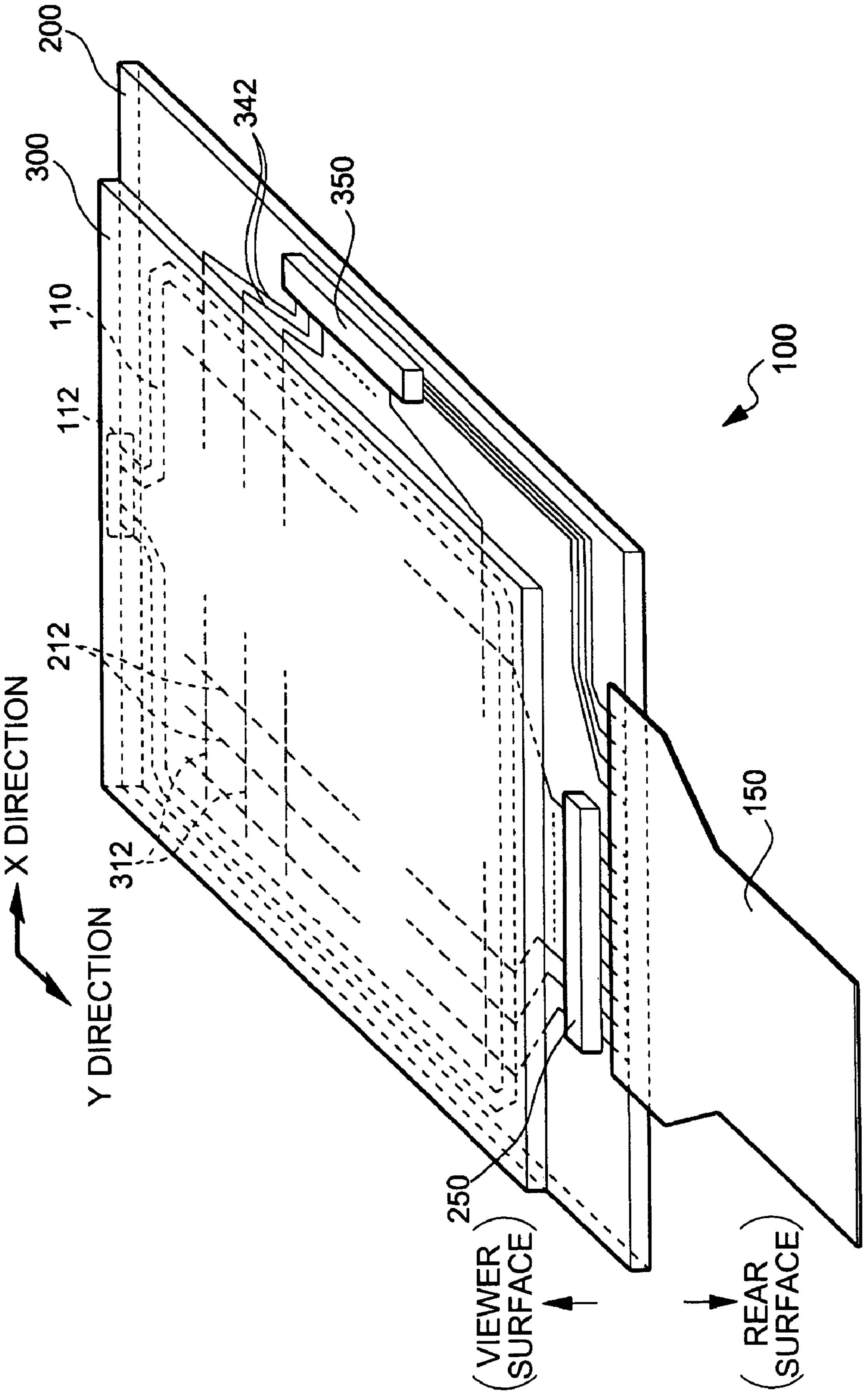
FIG. 2 is a perspective view showing the structure of the same electro-optical apparatus.
Figure 3:
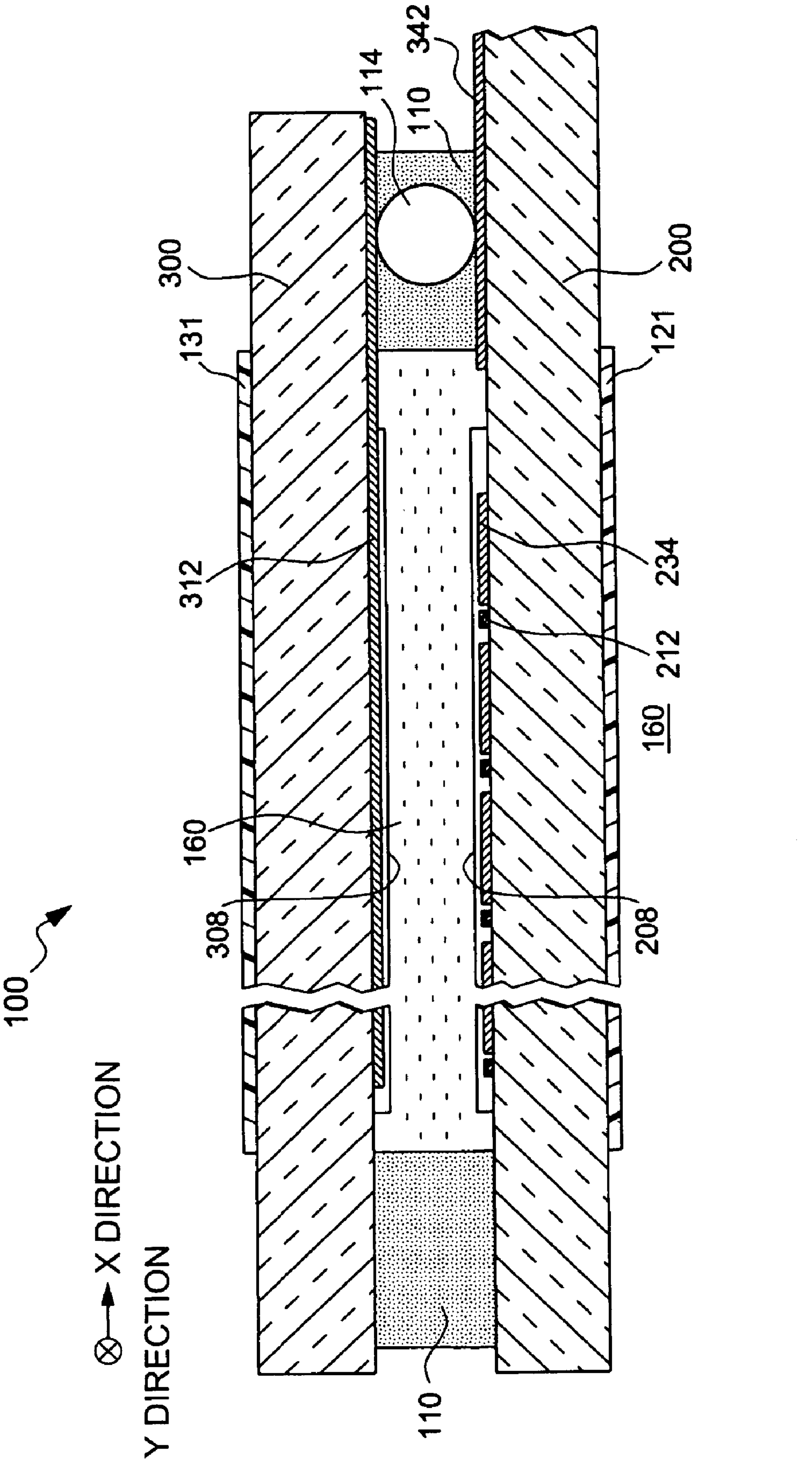
FIG. 3 is a cross-sectional view showing the structure of a liquid crystal panel in the same electro-optical apparatus.

FIG. 2 is a perspective view showing the overall structure of the liquid crystal panel 100. FIG. 3 is a cross-sectional cutaway view showing the structure of this liquid crystal panel 100 as taken along the X direction.

As shown in these figures, the liquid crystal panel 100 is constructed such that an element substrate 200 adjacent to the rear surface is laminated on a counter substrate 300 one size smaller than the element substrate 200 adjacent to the viewer surface with a certain gap preserved by a sealant 110 mixed with conductive particles 114, which also serve as spacers. Furthermore, this gap is filled with, for example, TN (Twisted Nematic) liquid crystal 160. The sealant 110, as shown in FIG. 2, is formed in a frame shape around the inner periphery of the counter substrate 300, and is provided at one part with an inlet through which the liquid crystal 160 is injected. For this reason, after the liquid crystal has been injected, the inlet port is sealed with a sealer 112.

On the counter surface of the counter substrate 300, an alignment film 308 is formed and subjected to rubbing in a particular direction, in addition to the scanning lines 312 which are stripe-shaped electrodes extending in the row (X) direction. Here, one end of each of the scanning lines 312 extends to the formation area of the sealant 110, particularly as shown in FIG. 3. Furthermore, a polarizer 131 is attached on the outer surface (viewer surface) of the counter substrate 300 (not shown in FIG. 2), and its absorption axis is set according to the direction of rubbing of the alignment film 308.

On the other hand, on the counter surface of the element substrate 200, rectangular pixel electrodes 234 are formed adjacent to the data lines 212 extending in the Y (column) direction. Furthermore, an alignment film 208 is formed and subjected to rubbing in a particular direction.

The element substrate 200 is provided with wires 342 such that each of the wires 342 establishes a one-to-one correspondence with one of the scanning lines 312. In detail, one end of each wire 342 is formed so as to oppose one end of the respective scanning line 312 in the formation area of the sealant 110, particularly as shown in FIG. 3. Here, the conductive particles 114 are dispersed in the sealant 110 at a concentration such that at least one conductive particle 114 intervenes at the portion where one end of each of the scanning lines 312 is opposed to one end of the respective wire 342. For this reason, each of the scanning lines 312 formed on the counter substrate 300 is connected to the respective wire 342 on the counter surface of the element substrate 200 via the relevant conductive particle 114. In other words from an electrical viewpoint, each of the scanning lines 312 is extracted outside the formation area of the sealant 110 on the element substrate 200.

Likewise, one end of each of the data lines 212 formed on the element substrate 200 is extracted outside the formation area of the sealant 110. Furthermore, a polarizer 121 is attached on the outer surface (rear surface) of the element substrate 200 (not shown in FIG. 2), and its absorption axis is set according to the direction of rubbing of the alignment film 208.

If the liquid crystal panel 100 according to this embodiment is assumed to be a transmissive-mode panel, a backlight unit for uniformly emitting light is provided on the rear surface of the element substrate 200. The backlight unit is not directly associated with the present invention, and therefore is not shown in the figure.

A description of the area outside the display area of the liquid crystal panel 100 follows. As shown in FIG. 2, the data-line drive circuit 250 for driving the data lines 212 and the scanning-line drive circuit 350 for driving the scanning lines 312 are provided by COG (Chip On Glass) technology on the two sides of the element substrate 200, i.e., the two side being projected from the outer edge of the counter substrate 300.

Thus, the data-line drive circuit 250 directly supplies the data lines 212 with a data signal, whereas the scanning-line drive circuit 350 supplies the scanning lines 312 with a scan signal indirectly, i.e., via the wires 342 and the conductive particles 114.

Furthermore, one end of an FPC (Flexible Printed Circuit) substrate 150 is connected adjacent to the portion outside the portion where the data-line drive circuit 250 is provided. Although not shown in FIG. 2, the other end of the FPC substrate 150 is connected to the control circuit 400, the voltage generation circuit 500, and the correction circuit 600 shown in FIG. 1.

Unlike those shown in FIG. 2, the data-line drive circuit 250 and the scanning-line drive circuit 350 shown in FIG. 1 are respectively disposed at the left side and the upper portion of the liquid crystal panel 100. This is for convenience in describing the electrical structure. Furthermore, instead of providing the data-line drive circuit 250 and the scanning-line drive circuit 350 on the element substrate 200 by COG, TCPs (Tape Carrier Packages) where drivers and power circuits are provided may be connected electrically and mechanically with anisotropic electroconductive films by, for example, TAB (Tape Automated Bonding) technology.

Figure 4:
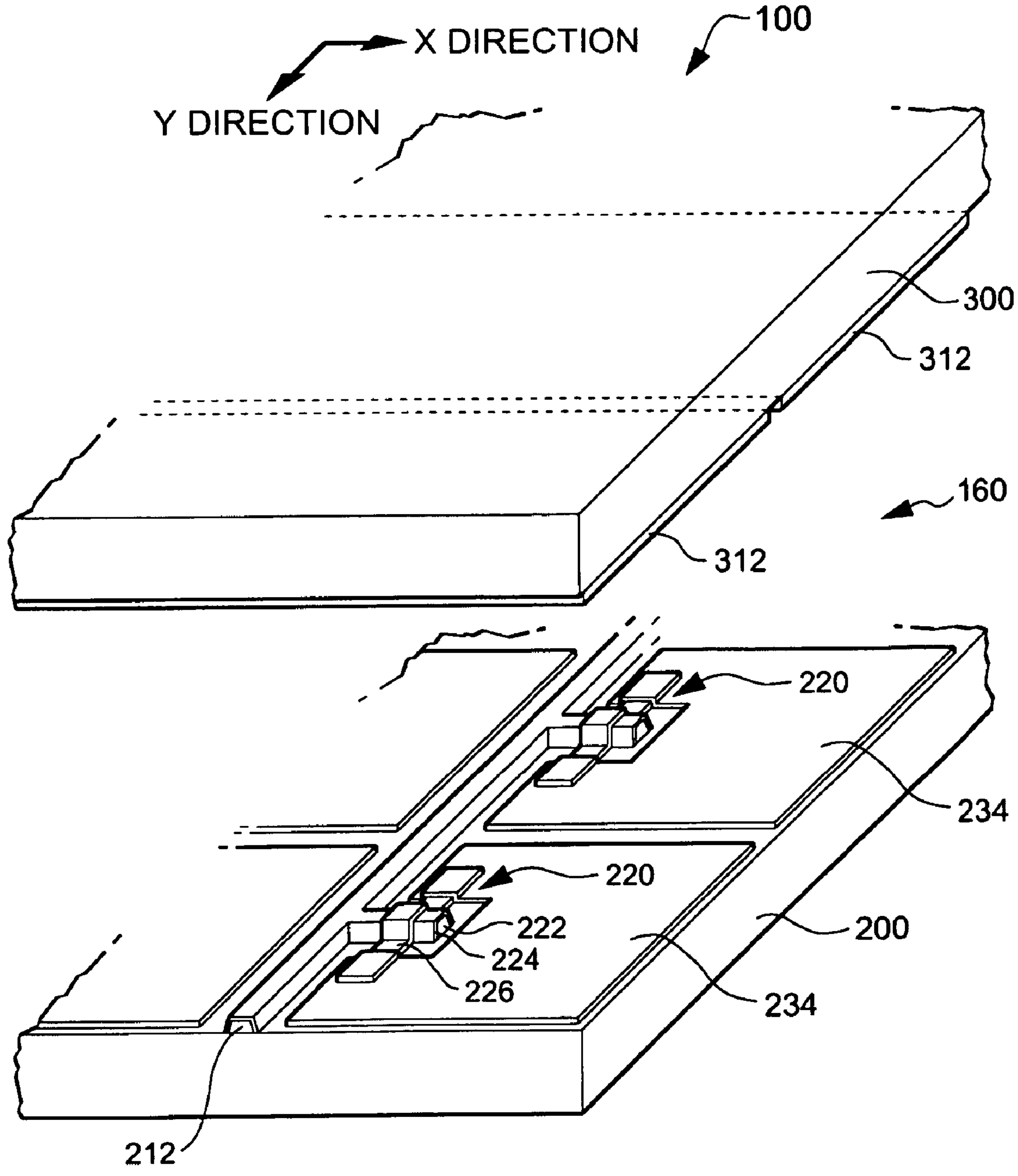
FIG. 4 is a partial perspective cutaway view showing the structure of a pixel in the same electro-optical apparatus.

A detailed structure of a pixel 116 in the liquid crystal panel 100 will now be described. FIG. 4 is a partial perspective cutaway view showing a portion of its structure. For convenience in description, the alignment films 208 and 308 and the polarizers 121 and 131 shown in FIG. 3 are not shown in this figure.

As shown in FIG. 4, on the counter surface of the element substrate 200, rectangular pixel electrodes 234 each including a transparent electric conductor, such as ITO (Indium Tin Oxide), are arranged in a matrix. From among these pixel electrodes 234, the pixel electrodes 234 arranged in the same column are commonly connected to one data line 212 via the respective TFDs 220. Here, each of the TFDs 220 is formed of a first electric conductor 222, which is made of tantalum or a tantalum alloy and branching in a T-shaped manner from the data line 212, an insulator 224 produced by applying anodic oxidation to this first electric conductor 222, and a second electric conductor 226 such as chromium laminated in that order from the substrate. In short, the TFD 220 has a sandwich structure of an electric conductor, an insulator, and an electric conductor in that order. For this reason, the TFD 220 has diode-switching characteristics exhibiting nonlinear current-voltage characteristics in both the positive and negative directions.

In FIG. 4, the pixel electrode 234, the data line 212, and other components are formed directly on the counter surface of the element substrate 200. However, the pixel electrode 234, the data line 212, and other components are preferably formed on a transparent insulator which can be formed on the relevant counter surface. Such a transparent insulator is preferably formed in order to prevent the first electric conductor 222 from peeling off due to heat processing after the second electric conductor 226 has been deposited and to prevent impurities from spreading in the first electric conductor 222.

On the other hand, on the counter surface of the counter substrate 300, the scanning lines 312 including, for example, ITO, extend in the row direction perpendicular to the data lines 212, and are arranged opposed to the pixel electrodes 234. Because of this, each of the scanning lines 312 functions as a counter electrode of the pixel electrode 234.

Thus, the liquid crystal capacitance 118 shown in FIG. 1 includes the relevant scanning line 312, the corresponding pixel electrode 234, and the liquid crystal 160 held between the relevant scanning line 312 and the corresponding pixel electrode 234 at the intersection of the data line 212 and the scanning line 312.

With such a structure, when either of the selection voltages $+V_S$ and $-V_S$ that forcibly make the TFD 220 conductive (ON) is applied to a scanning line 312 regardless of whether a data voltage is applied to a data line 212, the TFD 220 corresponding to the intersection of the relevant scanning line 312 and the relevant data line 212 is turned ON, and an electric charge according to the difference between the relevant selection voltage and the relevant data voltage is accumulated in the liquid crystal capacitance 118 connected to the TFD 220 that has been turned ON. After the accumulation of such an electric charge, even if the relevant TFD 220 is turned OFF by applying a deselection voltage to the scanning line 312, the accumulation of electric charge in the liquid crystal capacitance 118 is preserved.

In the liquid crystal capacitance 118, the alignment status of the liquid crystal 160 changes according to the amount of accumulated electric charge, and the amount of light passing through the polarizers 121 and 131 changes according to the amount of accumulated electric charge. Therefore, if it is assumed that the selection voltage does not vary, predetermined gradation display can be achieved by controlling the amount of electric charge accumulated in the liquid crystal capacitance 118 for each pixel, according to the data voltage when the relevant selection voltage is applied.

Here, signals, such as a control signal and a clock signal generated by the control circuit 400 in FIG. 1, will now be described for convenience in description.

Figure 6:
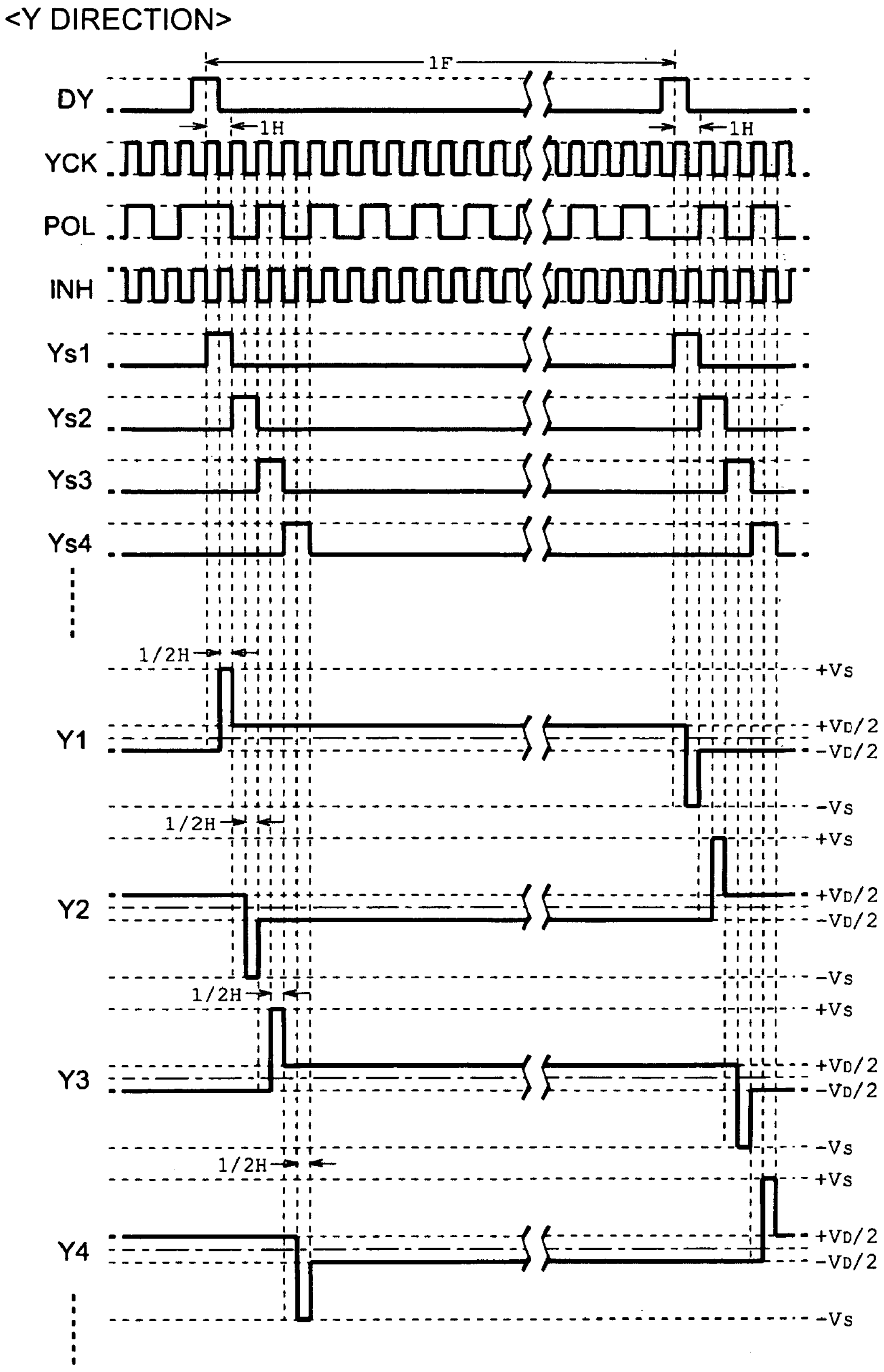
FIG. 6 is a diagram showing the waveform of a scan signal in the same scanning-line drive circuit.

Signals used for the Y direction (vertical scanning) will be described. First, a start pulse DY is a pulse output at the start of one vertical scanning period (1F), as shown in FIG. 6. Second, a clock signal YCK is a reference signal for the Y direction, as shown in the figure, and has a period equivalent to one horizontal scanning period (1H). Third, a polarity-indicating signal POL is a signal which specifies the polarity of a selection voltage to be applied when a scanning line is selected. For example, if the polarity-indicating signal POL is at the H level, it specifies the selection voltage $+V_S$ with positive polarity, and if the polarity-indicating signal POL is at the L level, it specifies the selection voltage $-V_S$ with negative polarity. As shown in the figure, the logic level of this polarity-indicating signal POL is inverted every one horizontal scanning period (1H) during the same vertical scanning period. Furthermore, the logic level in a horizontal scanning period of a vertical scanning period is inverted with respect to the logic level in the same horizontal period of the adjacent vertical scanning period. Fourth, a control signal INH is a signal for specifying the application period of a selection voltage during one horizontal scanning period (1H). As described below, according to this embodiment, a selection voltage is applied in the second-half period of one horizontal scanning period (1H), and therefore the control signal INH goes to the H level in the relevant second-half period.

Figure 8:
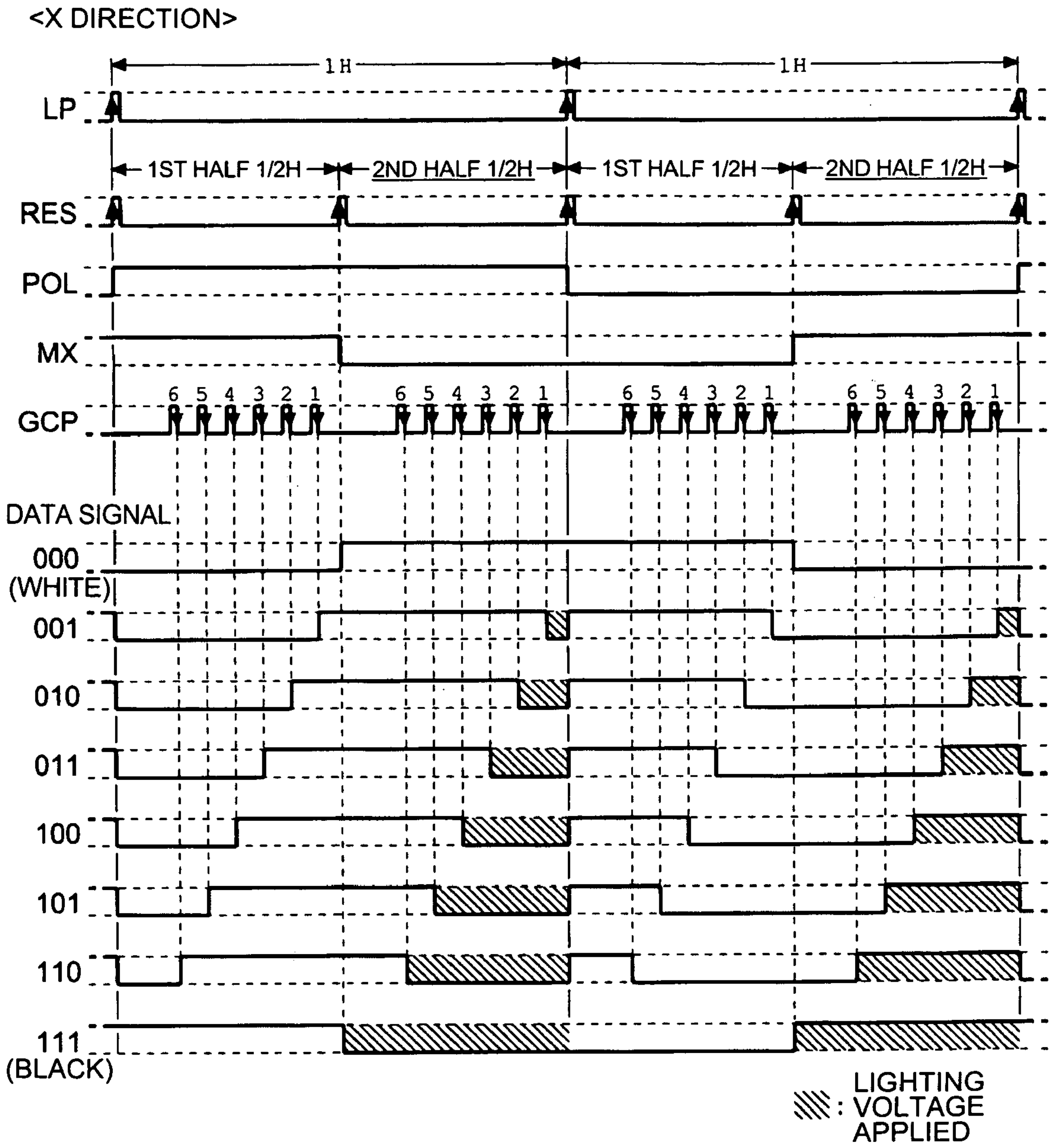
FIG. 8 is a diagram showing the waveform of a data signal in the same data-line drive circuit.

Signals used for the X direction (horizontal scanning) will now be described. First, as shown in FIG. 8, a latch pulse LP is a signal output at the start of one horizontal scanning period (1H). Second, as shown in the figure, a reset signal RES is a signal output at the start of the first-half period of one horizontal scanning period (1H) and at the start of the second-half period of the one horizontal scanning period (1H). Third, an AC driving signal MX is a signal for AC-driving pixels 116 in the data lines, and the phase of the AC driving signal MX is advanced by 90° compared with the polarity-indicating signal POL for the Y direction, as shown in the same figure. Thus, the AC driving signal MX goes to the H level in the first-half period of one horizontal scanning period (1H) in which the voltage $+V_S$ with positive polarity is specified as a selection voltage, and goes to the L level in the second-half period of the same horizontal scanning period (1H). In contrast, the AC driving signal MX goes to the L level in the first-half period of one horizontal scanning period (1H) in which the voltage $-V_S$ with negative polarity is specified as a selection voltage, and goes to the H level in the second-half period of the same horizontal scanning period (1H). Fourth, as shown in the same figure, gradation code pulses GCP are arranged in accordance with the order of gray levels (110), (101), (100), (011), (010), and (001) except white and black in each of the first-half and the second-half periods of one horizontal scanning period. In the same figure, in practice, the gradation code pulses GCP are determined taking into consideration the characteristics between applied voltage and density (V-T characteristics) of pixels, and are not spaced out at regular intervals.

Figure 5:
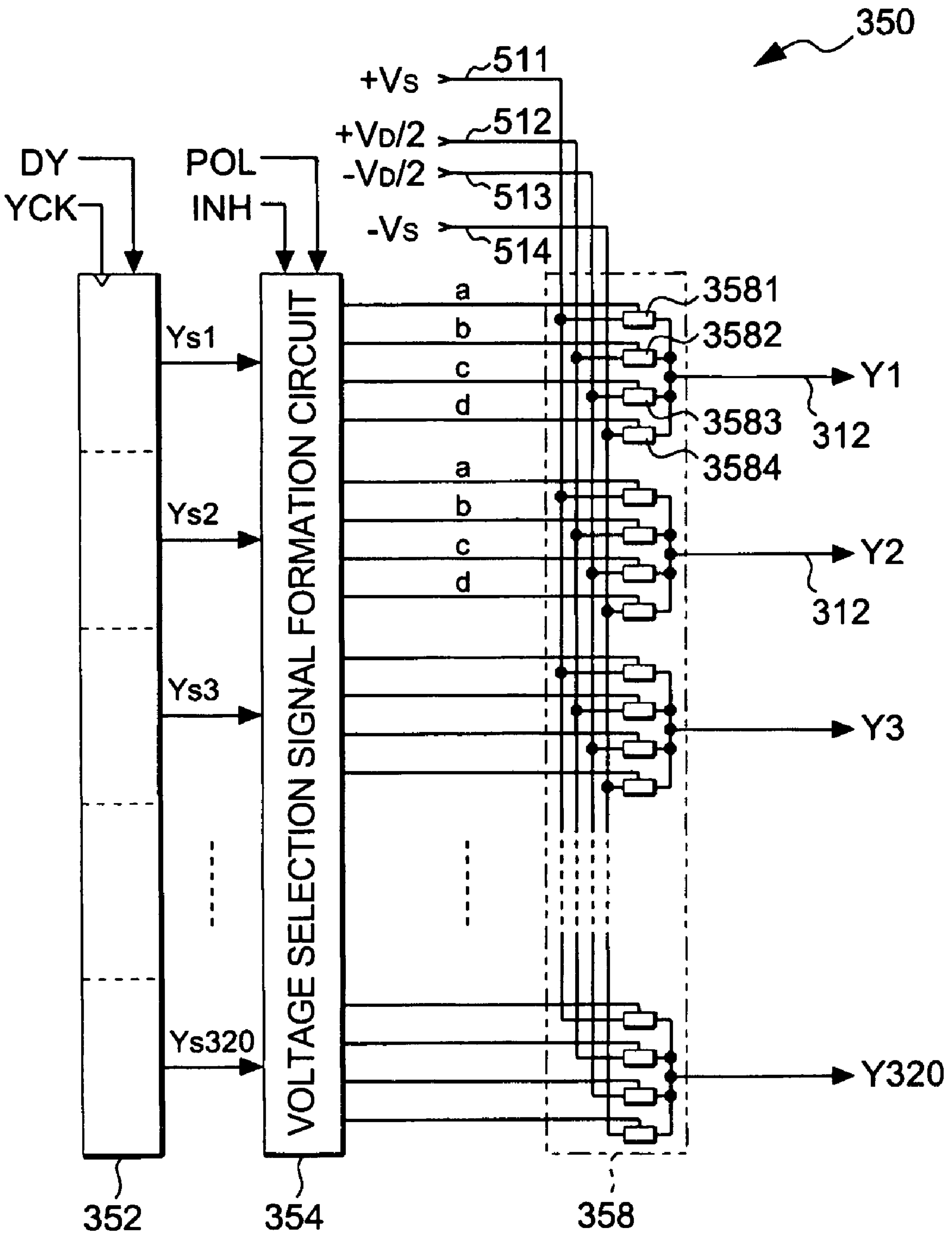
FIG. 5 is a block diagram showing the structure of a scanning-line drive circuit in the same electro-optical apparatus.

The scanning-line drive circuit will now be described. FIG. 5 is a block diagram showing the structure of this scanning-line drive circuit 350.

In this figure, the shift register 352 includes a 320-bit stage, i.e., a stage with the same number of bits as the total number of scanning lines 312. The shift register 352 sequentially shifts the start pulse DY supplied at the beginning of one vertical scanning period with the clock signal YCK to sequentially output it as transfer signals Ys1, Ys2, Ys3, . . . , Ys320. Here, the transfer signals Ys1, Ys2, Ys3, . . . , Ys320 establish a one-to-one correspondence with the scanning lines 312 in the first row, second row, third row, . . . , 320-th row, respectively. The H level of a transfer signal indicates a horizontal scanning period (1H) during which the scanning line 312 corresponding to the transfer signal is to be selected.

Subsequently, a voltage selection signal formation circuit 354 specifies a voltage applied to the scanning line 312 in one row on the basis of the polarity-indicating signal POL and the control signal INH, in addition to the transfer signal, and outputs voltage selection signals a, b, c, and d which go to the active level (H level) exclusively with respect to one another. Here, when the voltage selection signal a goes to the H level, the selection of $+V_S$ (positive-polarity selecting voltage) is indicated. Similarly, when the voltage selection signals b, c, and d go to the H level, the selection of $+V_D/2$ (positive-polarity deselecting voltage), $-V_D/2$ (negative-polarity deselecting voltage, and $-V_S$ (negative-polarity selecting voltage) are indicated, respectively.

According to this embodiment, as described above, the period during which the selection voltage $+V_S$ or $-V_S$ is applied is the second-half period 0.5H (denoted as /1;2H) of one horizontal scanning period (1H). Furthermore, the deselection voltage is $+V_D/2$ after the selection voltage $+V_S$ has been applied, and is $-V_D/2$ after the selection voltage $-V_S$ has been applied. In short, the deselection voltage is uniquely determined according to the previous selection voltage.

For this reason, the voltage selection signal formation circuit 354 outputs the voltage selection signals a, b, c, and d for the scanning line 312 in one row such that the voltage level of the scan signal has the relationship described below. That is, when one of the transfer signals Ys1, Ys2, . . . , Ys320 goes to the H level to indicate the horizontal scanning period during which the scanning line 312 corresponding to it is to be selected, and furthermore when the control signal INH goes to the H level so that the second-half period of the relevant horizontal scanning period is indicated, the voltage selection signal formation circuit 354 first sets the voltage level of the scan signal for the relevant scanning line 312 to the selection voltage with a polarity corresponding to the signal level of the polarity-indicating signal POL, and then generates a voltage selection signal so as to be the deselection voltage corresponding to the relevant selection voltage when the second-half period ends.

More specifically, if the polarity-indicating signal POL is the H level during a period in which the control signal INH is the H level, then the voltage selection signal formation circuit 354 sets the voltage selection signal a that allows the positive-polarity selecting voltage $+V_S$ to be selected to the H level during the relevant second-half period. When this second-half period ends and the control signal INH shifts to the L level, the voltage selection signal formation circuit 354 outputs the voltage selection signal b that allows the positive-polarity deselecting voltage $+V_D/2$ to be selected as the H level. On the other hand, if the polarity-indicating signal POL is the L level during the second-half period in which the control signal INH is the H level, then the voltage selection signal formation circuit 354 sets the voltage selection signal d that allows the negative-polarity selecting voltage $-V_S$ to be selected to the H level during the relevant period. Subsequently, when the control signal INH shifts to the L level, the voltage selection signal formation circuit 354 outputs the voltage selection signal c that allows the negative-polarity deselecting voltage $-V_D/2$ to be selected as the H level.

A selector group 358 includes four switches 3581 to 3584 for each scanning line 312. One end of each of these switches 3581 to 3584 is connected to the corresponding one of the supply lines 511 to 514, and the other ends of the switches 3581 to 3584 are commonly connected to the respective scanning line 312, and are supplied with voltage selection signals a, b, c, and d as gates. Then, when any one of the voltage selection signals a, b, c, and d which are gate-input goes to the active level, one end of the corresponding switch 3581, 3582, 3583 or 3584 becomes conductive to the other end of the same switch. Thus, the scanning line 312 becomes connected to one of the supply lines 511 to 514 via the switch 3581, 3582, 3583, or 3584, whichever is turned ON.

The voltage waveform of the scan signal supplied by the scanning-line drive circuit 350 with the above-described structure will now be described.

First, as shown in FIG. 6, the start pulse DY is sequentially shifted by the shift register 352 every one horizontal scanning period (1H) according to the clock signal YCK, and this is output as the transfer signals Ys1, Ys2, . . . , Ys320.

Here, when the second-half period (⁄1;2H) of one horizontal scanning period during which the transfer signal corresponding to the scanning line 312 in a certain row goes to the H level is reached, a selection voltage for the relevant scanning lines is determined according to the logic level of the polarity-indicating signal POL during the relevant second-half period.

In detail, the voltage of a scan signal supplied to a certain scanning line is the positive-polarity selecting voltage $+V_S$ if the polarity-indicating signal POL is, for example, the H level during the second-half period (⁄1;2H) of the one horizontal scanning period in which the relevant scanning line is selected. Subsequently, the positive-polarity deselecting voltage $+V_D/2$ corresponding to the relevant selection voltage is preserved. During the second-half period of the one horizontal scanning period after one vertical scanning period (1F) ends, the polarity-indicating signal POL is inverted to the L level. Hence, the voltage of the scan signal supplied to the relevant scanning lines becomes the negative-polarity selecting voltage $-V_S$. Subsequently, the negative-polarity deselecting voltage $-V_D/2$ corresponding to the relevant selection voltage is preserved.

For this reason, as shown in FIG. 6, during a certain vertical scanning period, the scan signal Y1 for the scanning line 312 in the first row becomes the positive-polarity selecting voltage $+V_S$ in accordance with the H level of the polarity-indicating signal POL in the second-half period of the relevant horizontal scanning period, and subsequently, the positive-polarity deselecting voltage $+V_D/2$ is preserved. In the second-half period of the subsequent one horizontal scanning period, the level of the polarity-indicating signal POL goes to the L level as a result of the logical inverse of the previous selection, and therefore the scan signal Y1 for the relevant scanning line becomes the negative-polarity selecting voltage $-V_S$. Subsequently, the negative-polarity deselecting voltage $-V_D/2$ is preserved. This cycle is then repeated.

Furthermore, the polarity-indicating signal POL inverts the logic level every one horizontal scanning period (1H), and hence scan signals supplied to the scanning lines 312 have such a relationship that the polarities are inverted alternately every one horizontal scanning period (1H), i.e., every row of the scanning lines 312. For example, in a certain frame, when the selection voltage of the scan signal Y1 in the first row is the positive-polarity selecting voltage $+V_S$, the selection voltage of the scan signal Y2 in the second row after the one horizontal scanning period has elapsed becomes the negative-polarity selecting voltage $-V_S$.

Figure 7:
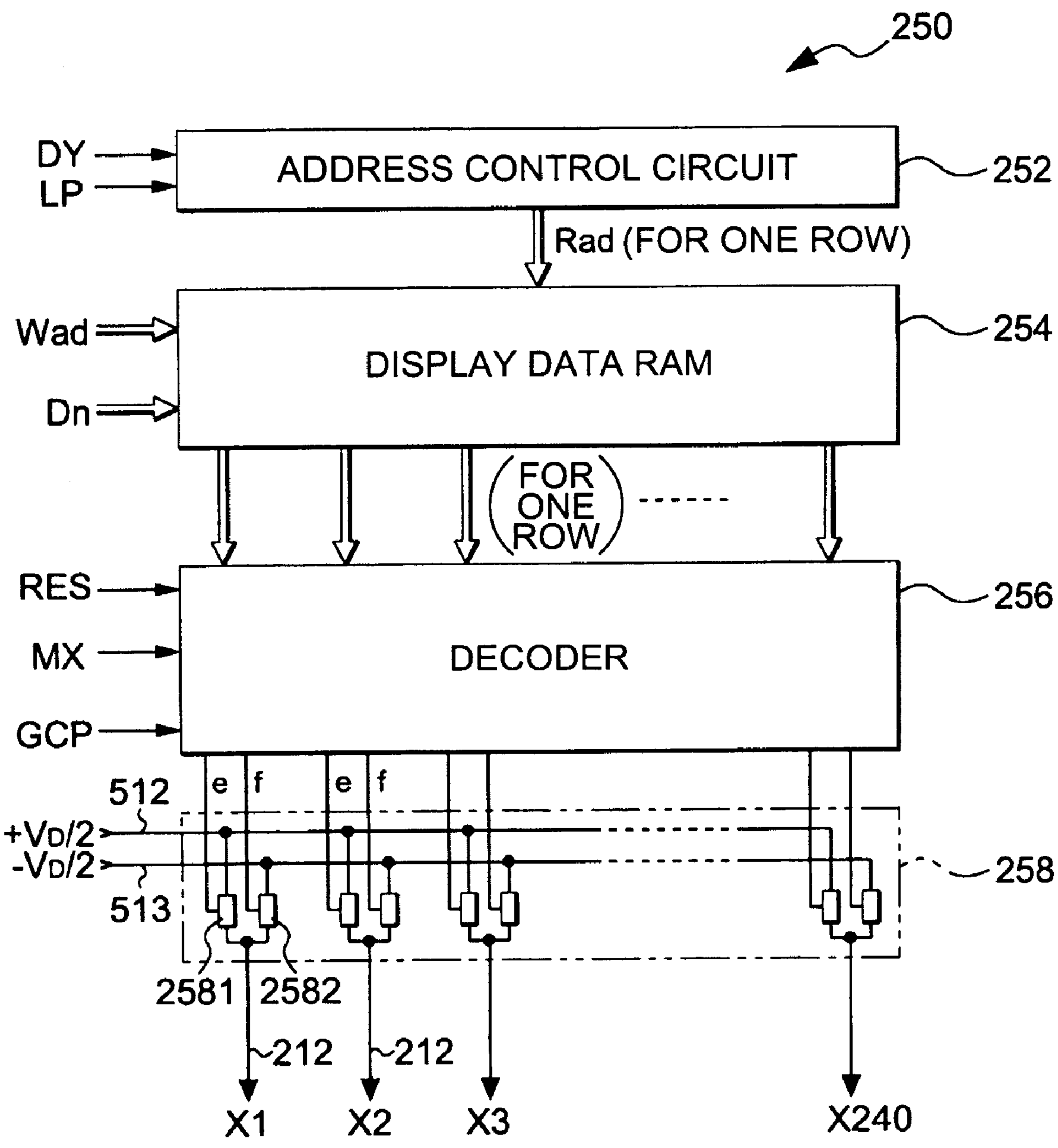
FIG. 7 is a block diagram showing the structure of a data-line drive circuit in the same electro-optical apparatus.

The data-line drive circuit 250 will now be described. FIG. 7 is a block diagram showing the structure of this data-line drive circuit 250. In this figure, an address control circuit 252 generates a row address Rad used for reading out gradation data. The address control circuit 252 resets the relevant row address Rad with the starting pulse DY supplied at the beginning of one frame and causes the relevant row address Rad to shift forward with the latch pulse LP supplied every one horizontal scanning period.

A display data RAM 254 is a dual-port RAM with a storage space for pixels of 320 vertically arranged rows×240 horizontally arranged columns. At the writing port, the gradation data Dn supplied from the control circuit 400 in FIG. 1 is written to the address specified with the write address Wad from the same control circuit 400. On the other hand, at the reading port, 240 items of gradation data Dn for one row at the address specified with the row address Rad are read out all at the same time.

Then, a decoder 256 exclusively generates voltage selection signals e and f for selecting each data voltage of the data signals X1, X2, . . . , X240 from the reset signal RES, the AC-driving signal MX, and the gradation code pulse GCP according to the 240 read-out items of the gradation data Dn. Here, the voltage selection signal e specifies the selection of $+V_D/2$ and the voltage selection signal f specifies the selection of $-V_D/2$. According to this embodiment, the gradation data Dn is composed of 3 bits (eight gradations) as described above. The decoder 256 generates the following voltage selection signal in relation to the gradation data Dn in a certain column from among the 240 read-out items of gradation data Dn.

More specifically, if the gradation data Dn in the row specifies a gray level other than white (000) and black (111) in one horizontal scanning period (1H) during which the polarity-indicating signal POL is the H level, the decoder 256 generates a voltage selection signal that satisfies the following requirements. First, the voltage selection signal is reset to the level opposite to that of the AC-driving signal MX according to the reset signal RES supplied at the beginning of the first-half period (⁄1;2H) of the one horizontal scanning period. Second, the voltage selection signal is set to the same level as that of the AC driving signal MX at the trailing edge of the gradation code pulse GCP corresponding to the relevant gradation data Dn. Third, the voltage selection signal ignores the reset signal RES supplied at the beginning of the second-half period (⁄1;2H) of the one horizontal scanning period. Fourth, the voltage selection signal is reset to the same level as that of the AC driving signal MX at the trailing edge of the gradation code pulse GCP corresponding to the relevant gradation data Dn. In one horizontal scanning period (1H) during which the polarity-indicating signal POL is the H level, the decoder 256 generates the voltage selection signals e and f so as to have a level inverted with respect to that of the AC-driving signal MX if the gradation data Dn is white (000), and so as to have the same level as that of the AC driving signal MX if the gradation data Dn is black (111).

Furthermore, in one horizontal scanning period (1H) during which the polarity-indicating signal POL is the L level, the decoder 256 generates the voltage selection signals e and f so as to have levels opposite to those in the one horizontal scanning period (1H) during which the polarity-indicating signal POL is the H level.

The decoder 256 generates these voltage selection signals for each of the 240 items of gradation data Dn that have been read out.

A selector group 358 includes two switches 2581 and 2582 for a column of data lines 212. One end of each of the switches 2581 and 2582 is connected to the corresponding one of the supply lines 512 and 513. On the other hand, the other ends of the switches 2581 and 2582 are commonly connected to the respective data lines 212, and are supplied with voltage selection signals e and f as gates. Then, when any one of the voltage selection signals e and f which are gate-input goes to the active level, one end of the corresponding switch 2581 or 2582 becomes conductive to the other end of the same switch. Thus, the data line 212 becomes connected to one of the supply lines 512 and 513 via the switch 2581 or 2582, whichever is turned ON.

Consequently, the voltage waveform of a data signal Xj supplied by the data-line drive circuit 250 is as shown in FIG. 8. FIG. 8 shows the relationship between the binary representation of gradation data Dn input to the decoder 256 and the data signal Xj resulting from the decoding of the gradation data Dn.

Figure 9:
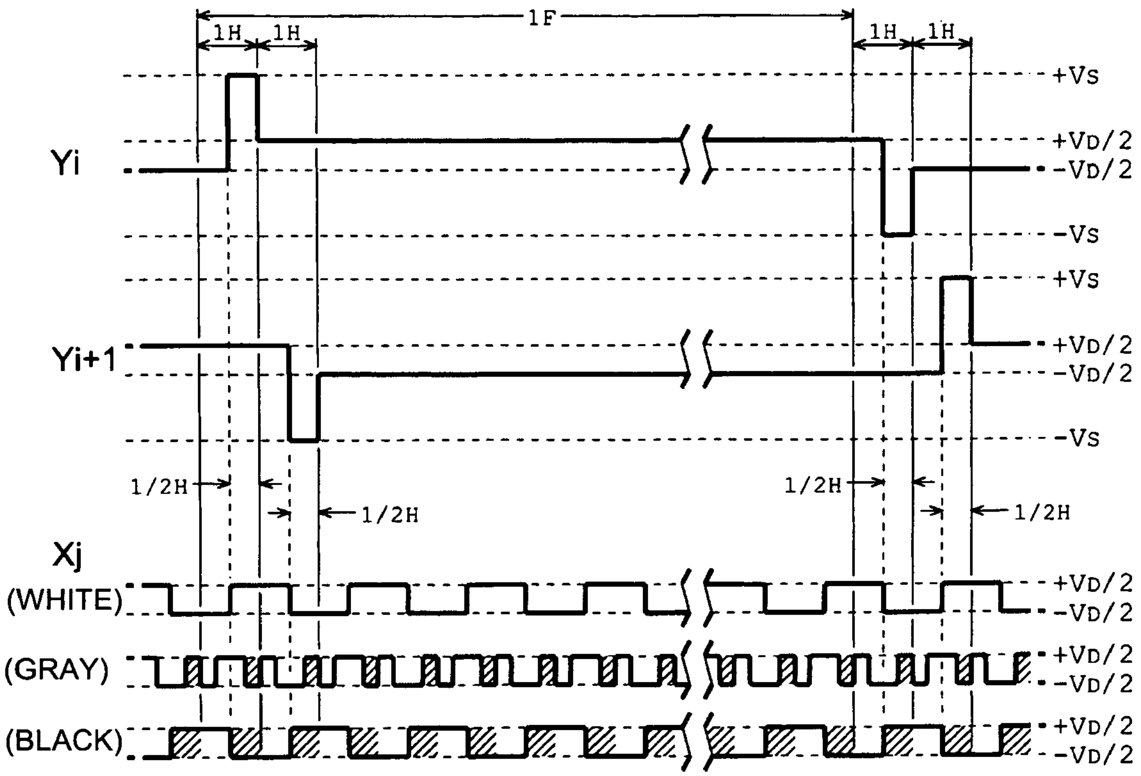
FIG. 9 is a diagram showing waveforms of signals applied to pixels in the same electro-optical apparatus.

FIG. 9 is a diagram showing waveforms of a scan signal Yi for the scanning line 312 in the i-th row, a scan signal Yi+1 for the scanning line 312 in the i+1-th row below the i-th row, and the data signal Xj for the data line 212 in the j-th column. This data signal Xj is indicated for the cases where pixels disposed in the scanning lines 312 in the i-th row and the i+1-th row and in the data line 212 in the j-th column exhibit white display, black display, and gradation display.

As shown in these figures, one horizontal scanning period (1H) is divided into two periods: a first-half period and a second-half period. Furthermore, the scan signals Yi and Yi+1 take the selection voltage over the second-half period (⁄1;2H), and the data signal Xj takes the lighting voltage for a longer period of time as the pixels are made darker. Here, the lighting voltage refers to the data voltage $-V_D/2$ with negative polarity when the selection voltage is $+V_S$ with positive polarity, whereas the lighting voltage is the data voltage $+V_D/2$ with positive polarity when the selection voltage is $-V_S$ with negative polarity. On the other hand, the data signal in the first-half period preceding the relevant second-half period has a voltage opposite to that of the data signal in the relevant second-half period.

Thus, the data signal Xj takes the voltages $+V_D/2$ and $-V_D/2$ for a proportion of 50%, respectively, within one horizontal scanning period (1H). For this reason, whatever pattern is taken by the pixel gradations, the total period during which the data signal Xj takes the voltage $-V_D/2$ and the total period during which the data signal Xj takes the voltage $+V_D/2$ become equivalent within one vertical scanning period (1F). This means that the RMS values of voltages applied to pixels during the deselection period are equivalent across all pixels, and therefore, cross-talk in the column (vertical) direction can be prevented from occurring even when a checkered pattern, i.e., alternate arrangement of white pixels and black pixels every row and every column, or a zebra pattern, i.e., alternate arrangement of white pixels and black pixels every row, is displayed. Cross-talk in this vertical direction is also described in, for example, FIG. 10 of Japanese Unexamined Patent Application Publication No. 2001-147671.

Figure 10:
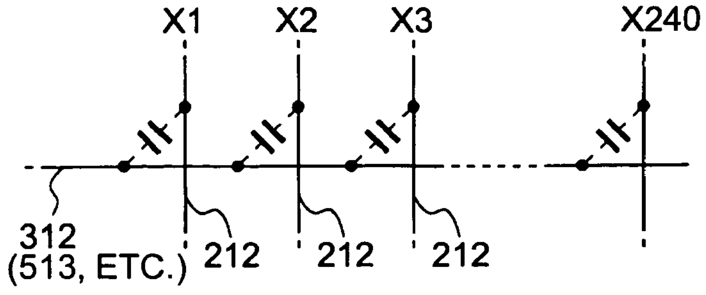
FIG. 10 is a diagram showing an equivalent circuit of the scanning line in the i-th row and data lines.

In the above-described embodiment, since the scanning lines 312 are formed of a metal with relatively high resistivity such as ITO, the relevant scanning line 312 in the i-th row capacitively couples with all data lines 212 from the first column to the 240-th column, as shown in FIG. 10. Furthermore, all of the wires and signal lines in the liquid crystal panel 100 capacitively couple with all data lines 212 to some degree, as well as with the scanning lines 312.

Particularly for the supply lines 511 to 514, since part thereof is formed on the element substrate 200, the degree of coupling is high. When a data line 212 switches from one of the voltages $+V_D/2$ and $-V_D/2$ to the other, a spike (differential waveform noise) results in scanning lines, wires, and supply lines.

In an image displayed on the liquid crystal panel 100, if there is a low correlation between the gradations of pixels (e.g., when the image is a natural image), voltage switching occurs over many data lines 212. Consequently, the level of spike is low enough to ignore.

In contrast, in an image displayed on the liquid crystal panel 100, if there is a high correlation between gradations of pixels adjacent to one another (e.g., when the image is a data image), voltage switching occurs in a concentrated manner over the data lines 212. Consequently, although the number of spikes is small, the levels of the spikes are too high to ignore. In particular, if a spike causes the mean value in the selection voltage application period to vary, the RMS value of voltage applied to the liquid crystal capacitance 118 changes accordingly. This causes a display with gradations different from what they should be.

Figure 11A:
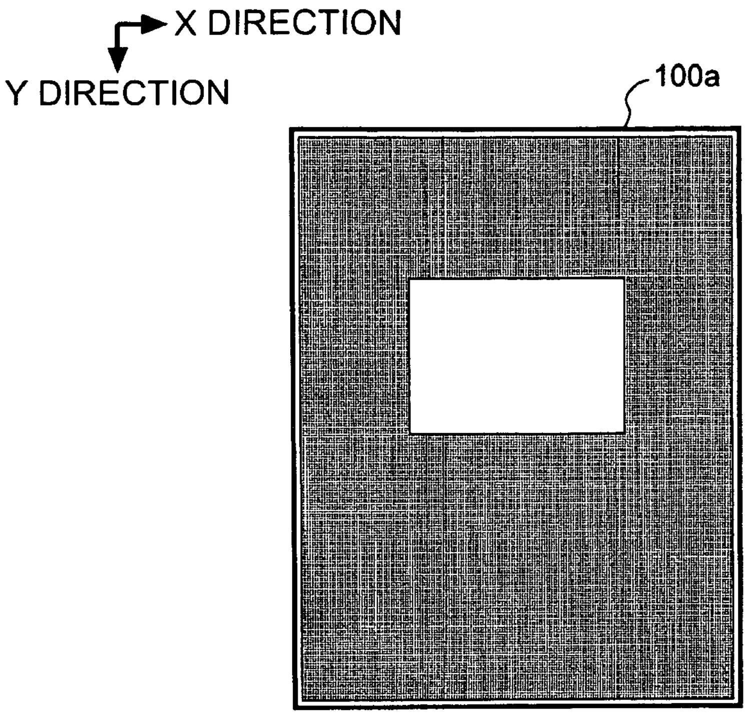
FIGS. 11A and B are diagrams showing an example of occurrence of horizontal cross-talk in the same electro-optical apparatus.
Figure 11B:
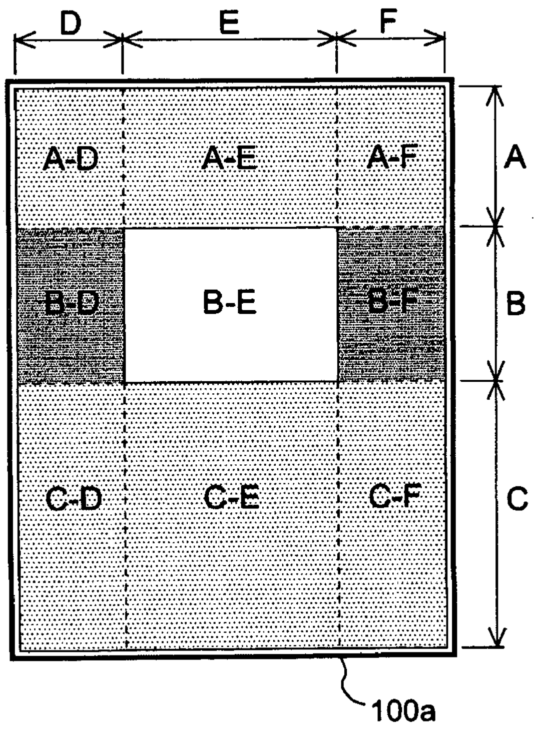

For example, let us assume that a rectangular white area is to be displayed as a window on a gray background in the display area 100*a* of the liquid crystal panel, as shown in FIG. 11(*a*). As shown in FIG. 11(*b*), in the image actually displayed in this case, gray areas A-D, A-E, A-F, C-D, C-E, and C-F become brighter than areas B-D and B-F adjacent to a white area B-E in the horizontal (row) direction.

This difference in display occurs in the row direction, and hence is also referred to as horizontal cross-talk to discriminate it from the cross-talk in the vertical direction described above.

Figure 12A:
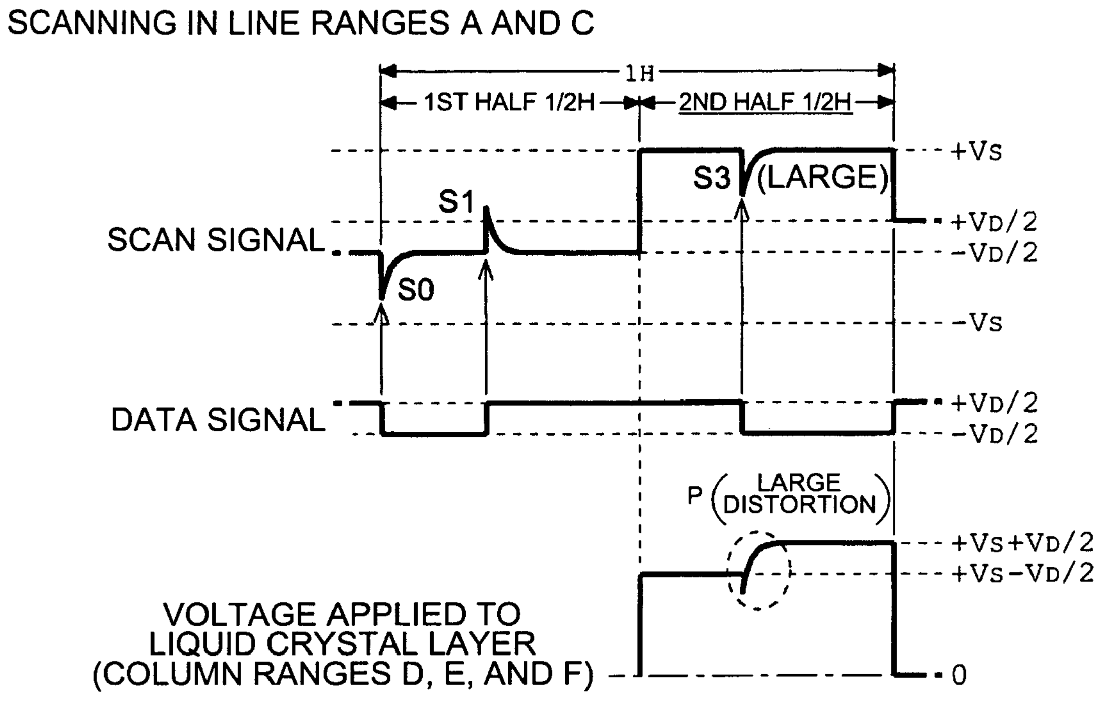
FIGS. 12A and B are diagrams for describing the cause of occurrence of horizontal cross-talk.
Figure 12B:
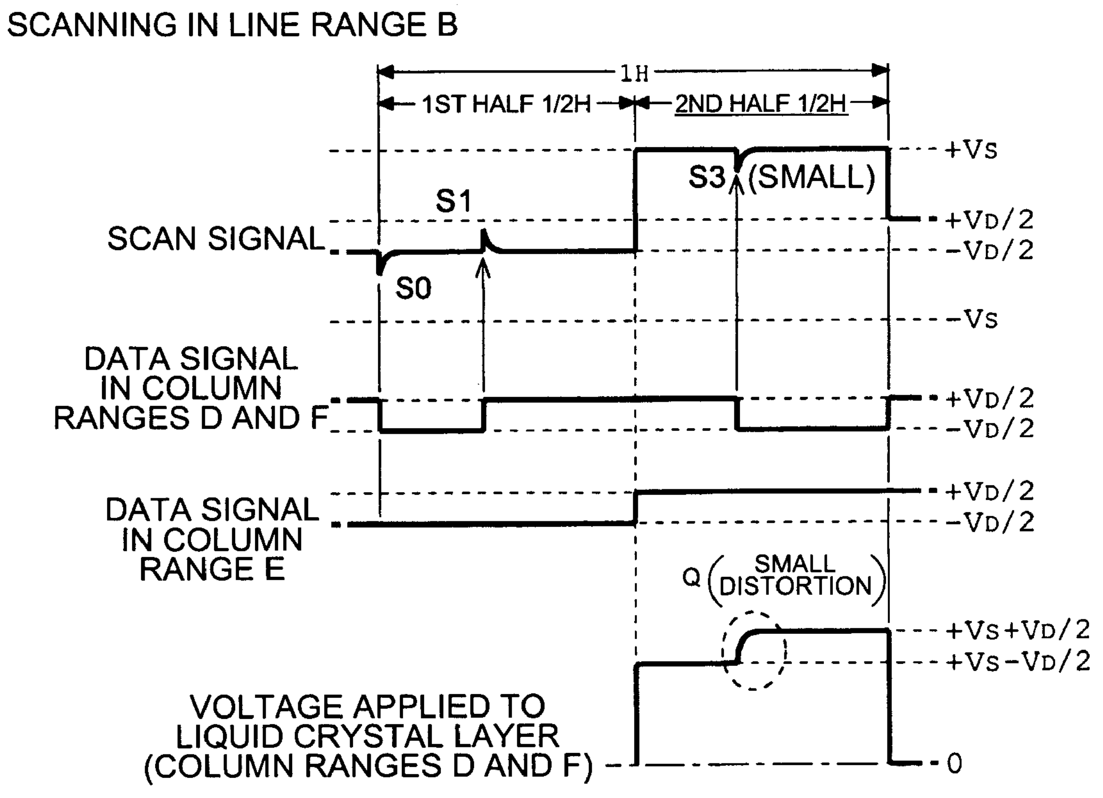

This horizontal cross-talk will be examined in terms of the signal waveform applied to a liquid crystal capacitance. In FIG. 11(*b*), when the scanning lines within the line range A or the line range C are selected, all the relevant pixels disposed in the scanning lines exhibit the gray background. For this reason, as shown in FIG. 12(*a*), the voltages of all data signals are simultaneously switched at the start of one horizontal scanning period (1H), at a halfway point in the first-half period, and at a halfway point in the second-half period, if the selection voltage with positive polarity is applied to the relevant scanning lines. Therefore, the scan signal undergoes relatively large spikes S0, S1, and S3 in the direction in which the voltage is switched.

Of these spikes, the spikes S0 and S1 appear during the period in which the deselection voltage is taken as the scan signal, more specifically, while the TFDs 220 are nonconductive. Therefore, these spikes have only a slight effect. On the other hand, the spike S3 occurs during the period in which the selection voltage is taken as the scan signal, more specifically, while the TFDs 220 are conductive. Therefore, this spike S3 causes the relevant selection voltage $+V_S$ to greatly vary. Consequently, this spike S3 greatly distorts the waveform of voltage applied to pixels, i.e., the voltage represented by the difference between the scan signal and the data signal, as shown by a portion P in the figure.

FIG. 12(*a*) shows one horizontal scanning period which takes the selection voltage $+V_S$ with positive polarity in the second-half period. Also in one horizontal scanning period during which the selection voltage $-V_S$ with negative polarity is taken, the waveform of the voltage applied to pixels is greatly distorted in the same manner, although the polarities are inverted with respect to the voltage reference point.

Therefore, the pixels in the line range A and the line range C (pixels in the areas A-D, A-E, A-F, C-D, C-E, and C-F) exhibit significantly lower values than what the applied voltage is intended to be, and hence these pixels become bright in a normally white mode.

On the other hand, in FIG. 11(*b*), when the scanning lines in the line range B are selected, the pixels disposed in the relevant scanning lines exhibit two types of gray levels: background gray and white. For this reason, as shown in FIG. 12(*b*), the data signals are classified into two groups: one group is supplied to the data lines in the column ranges D and F corresponding to the background gray and the other group is supplied to the data lines in the column range E corresponding to the white area, if the selection voltage $+V_S$ with positive polarity is applied to the relevant scanning lines. In other words, compared with a case where all data signals correspond to the same level of gray, as when the scanning lines within the line range A or the line range C are selected, the number of data signals corresponding to the relevant gray is approximately halved in a case where the scanning lines within the line range B are selected. Therefore, the spikes S0, S1, and S3 appearing when the scanning lines within the line range B are selected become smaller than when the scanning lines within the line range A or line range C are selected. For this reason, the spike S3 appearing in the second-half period does not significantly vary the selection voltage $+V_S$ taken by the scan signal, and hence the waveform of the voltage applied to pixels is also subjected to only a small degree of distortion, as shown by a portion Q in the figure. This is true with one horizontal scanning period during which the selection voltage $-V_S$ with negative polarity is taken. Thus, the pixels in the areas B-D and B-F become slightly brighter.

As a result, when the pixels in the areas A-D, A-E, A-F, C-D, C-E, and C-F are compared with the pixels in the areas B-D and B-F, although the pixels in all areas should exhibit the same gradation, the pixels in the areas A-D, A-E, A-F, C-D, C-E, and C-F become brighter than those in the areas B-D and B-F, as shown in FIG. 11(*b*). This difference in gradation is recognized as horizontal cross-talk. Horizontal cross-talk is generated possibly because the degree of spike varying depending on the number of data lines (data signals) for which the voltage is changed with the same timing causes the mean value during the period of the application of the selection voltage to differ each time the scanning lines are selected.

The problem of insufficient voltage applied to pixels within the line range A and the line range C has nothing to do with whether or not the white area is to be displayed. Thus, for example, even when the same level of gray is to be displayed on the entire screen, a voltage applied to pixels will be insufficient in the same manner. However, when the same level of gray is to be displayed on the entire screen, the spike S3 uniformly affects all pixels, and therefore the difference in brightness is not noticed. Consequently, the problem of horizontal cross-talk is not noticeable. It should be noted, however, that there is a problem in that the desired voltage is not applied correctly to the pixels.

Figure 13:
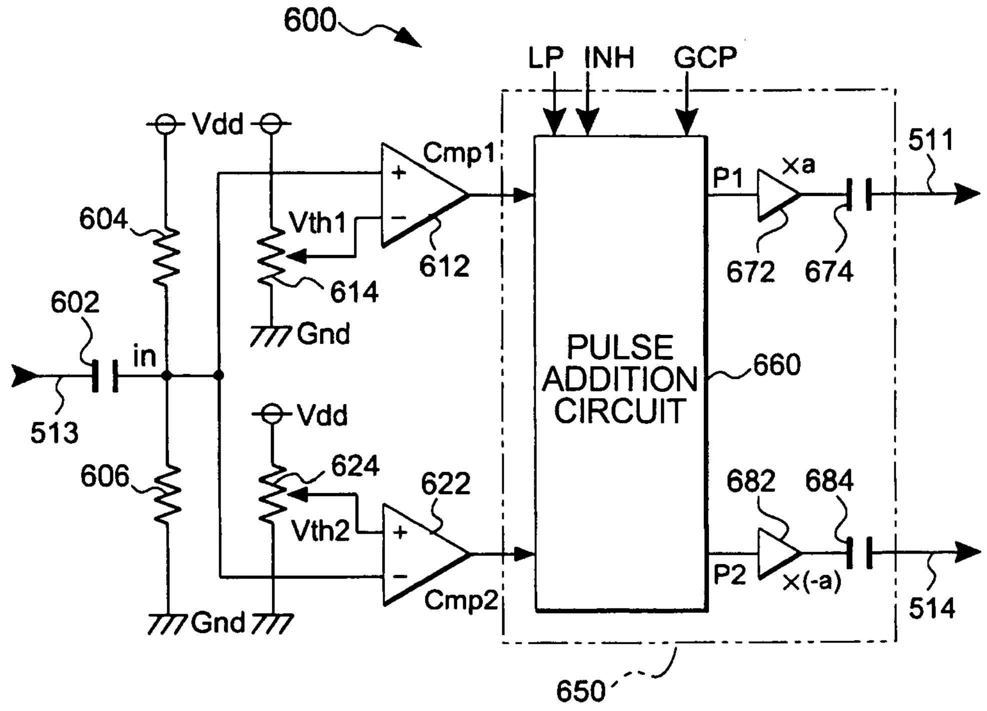
FIG. 13 is a block diagram showing the structure of a correction circuit in the same electro-optical apparatus.

The structure of the correction circuit 600 for preventing the occurrence of horizontal cross-talk will now be described. FIG. 13 is a block diagram showing the structure of the correction circuit 600.

As shown in this figure, one end of a coupling capacitor 602 is connected to the supply line 513 which supplies a data voltage with negative polarity (and a deselection voltage) $-V_D/2$. On the other hand, the other end of the coupling capacitor 602 is connected to a terminal in, which is connected to a node between resistors 604 and 606 serially connected between the supply line of a power voltage Vdd and a grounding line Gnd. Here, the resistances of the resistors 604 and 606 are determined so that the potential of the terminal in is zero, i.e., the intermediate potential between the voltages $\pm V_D/2$. According to this embodiment, the potential of the grounding line Gnd is not zero but a negative value (e.g., $-V_D/2$).

On the other hand, the terminal in is connected to the positive input terminal (+) of a comparator 612. A threshold voltage Vth1 adjusted according to a resistor 614 is supplied to the negative input terminal (−) of the comparator 612. The terminal in is also connected to the negative input terminal (−) of a comparator 622, and a threshold voltage Vth2 adjusted according to a resistor 624 is supplied to positive input terminal (+) of the comparator 622.

The comparators 612 and 622 function as determination circuits which respectively output signals Cmp1 and Cmp2, which go to the H level when the voltage supplied to the respective positive input terminal (+) is above the voltage supplied to the corresponding negative input terminal (−). The threshold voltages Vth1 and Vth2 have such a relationship with each other that Vth1>0>Vth2 and Vth1≈−Vth2.

A conversion/delay circuit 660, details of which will be described in the following paragraph, partially eliminates the pulses generated in the signal Cmp1 by the comparator 612 and in the signal Cmp2 by the comparator 622, and then delays the pulses by a/1;2H period to output them as signals P1 and P2, respectively. A buffer 672 multiplies the signal P1 by a factor a. One end of a coupling capacitor 674 is connected to the output terminal of the buffer 672, whereas the other end of the coupling capacitor 674 is connected to the supply line 511 for the positive-polarity selecting voltage $+V_S$. Furthermore, a buffer 682 multiplies the signal P2 by a factor (−a) to carry out polarity inversion. One end of a coupling capacitor 684 is connected to the output terminal of the buffer 682, whereas the other end of the coupling capacitor 684 is connected to the supply line 514 of the negative-polarity selecting voltage $-V_S$. The conversion/delay circuit 660, the buffers 672 and 684, and the coupling capacitors 674 and 684 constitute a pulse addition circuit 650.

Figure 14:
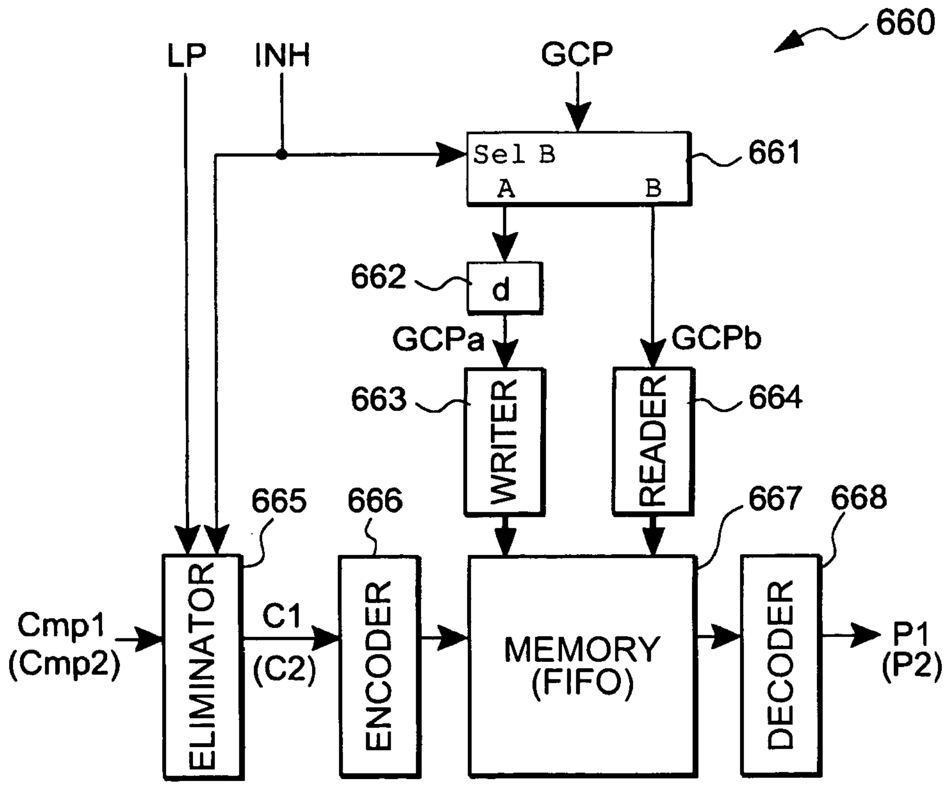
FIG. 14 is a block diagram showing the structure of a conversion/delay circuit in the same correction circuit.

The structure of the conversion/delay circuit 660 will now be described. FIG. 14 is a block diagram showing the structure of the conversion/delay circuit 660. This figure shows only one flow from the signal Cmp1 output by the comparator 612 to the output of the signal P1. Although another flow from the signal Cmp2 output by the comparator 622 to the output of the signal P2 is also used, the structure is the same and is not shown in the figure.

Referring to FIG. 14, a selector 661 outputs a gradation code pulse GCP to an output terminal A during the first-half period of one horizontal scanning period in which the control signal INH is the L level. On the other hand, the selector 661 outputs a gradation code pulse GCP to an output terminal B during the second-half period in which the control signal is the H level. A delaying unit 662 delays the gradation code pulse GCP supplied from the output terminal A of the selector 661 by a time d, and outputs it as a gradation code pulse GCPa.

A writer 663 specifies the write timing of data encoded by an encoder 666, to be described below, according to the trailing timing of the gradation code pulse GCPa. Furthermore, a reader 664 specifies the read timing of the relevant encoded data according to the trailing timing of the gradation code pulse GCPb supplied from the output terminal B of the selector 661.

On the other hand, an eliminator 665 eliminates, from among the pulses included in the signal Cmp1, the pulses included in the timing with which the latch pulse LP is output (i.e., the timing with which one horizontal scanning period starts) and the pulses included in a period in which the control signal INH is the H level (i.e., the second-half period of the one horizontal scanning period). The eliminator 665 then outputs the resultant pulses as a signal C1.

An encoder 666 encodes any pulse occurring in the signal C1 to data indicating the pulse width. Although not shown in detail in the figure, when the signal C1 rises, the encoder 666 starts counting clock signals with sufficiently high frequency, and when the signal C1 falls, the encoder 666 latch-outputs the relevant count value as encoded data. Thus, if a pulse occurs in the signal C1, a period of time longer than the pulse width is required until the pulse width is determined after the rising of the pulse.

A memory 667 is based on an FIFO scheme, and sequentially stores data encoded by the encoder 666 with the timing specified by the writer 663. Furthermore, the memory 667 is sequentially read out with the timing specified by the reader 664.

When encoded data is read out from the memory 667, the decoder 668 carries out decoding of the data into a pulse with a width indicated by the relevant encoded data for output as the signal P1, only when the relevant encoded data is subjected to a change.

Figure 15:
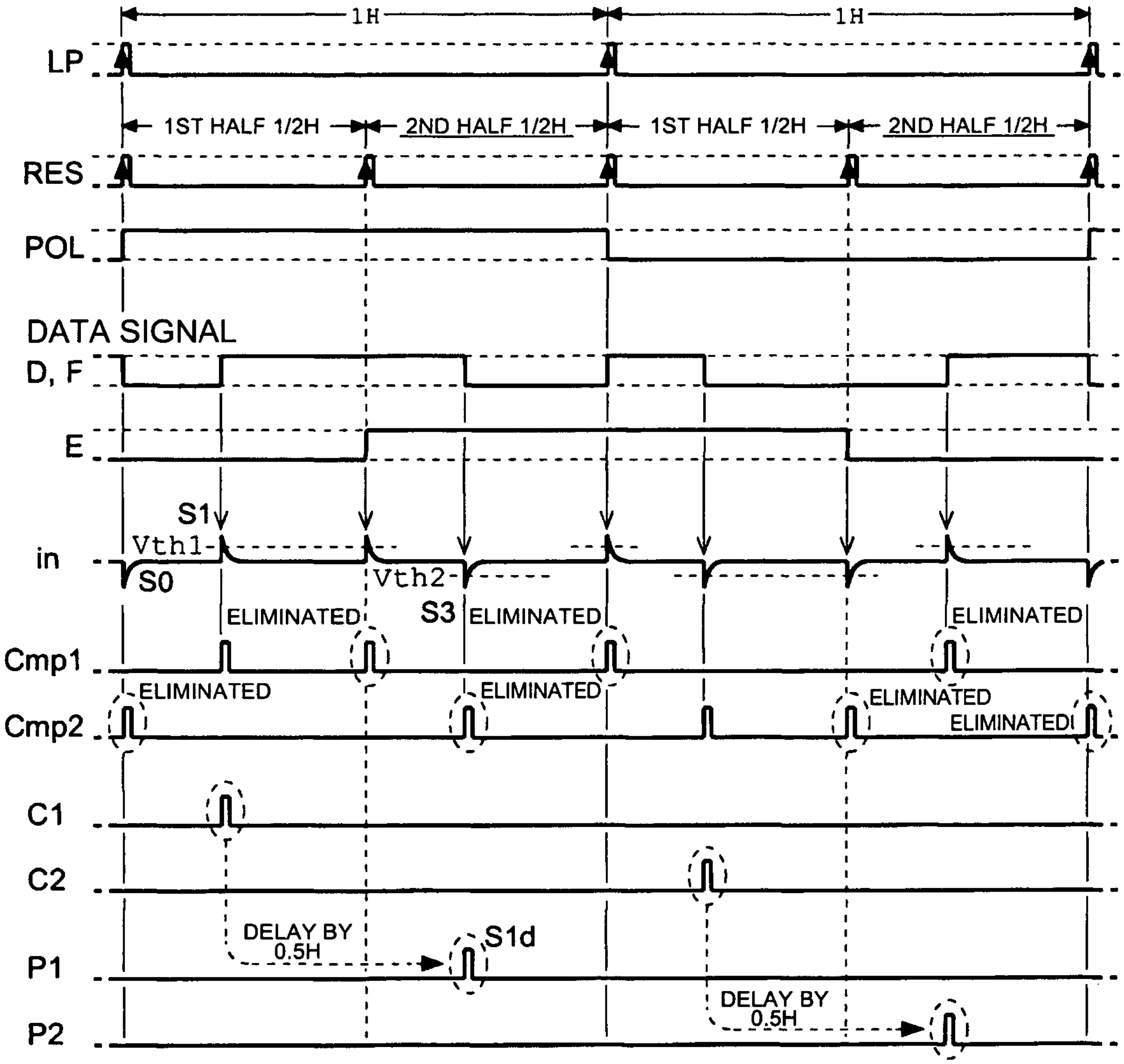
FIG. 15 is a timing chart for describing the operation of the same correction circuit.
Figure 16:
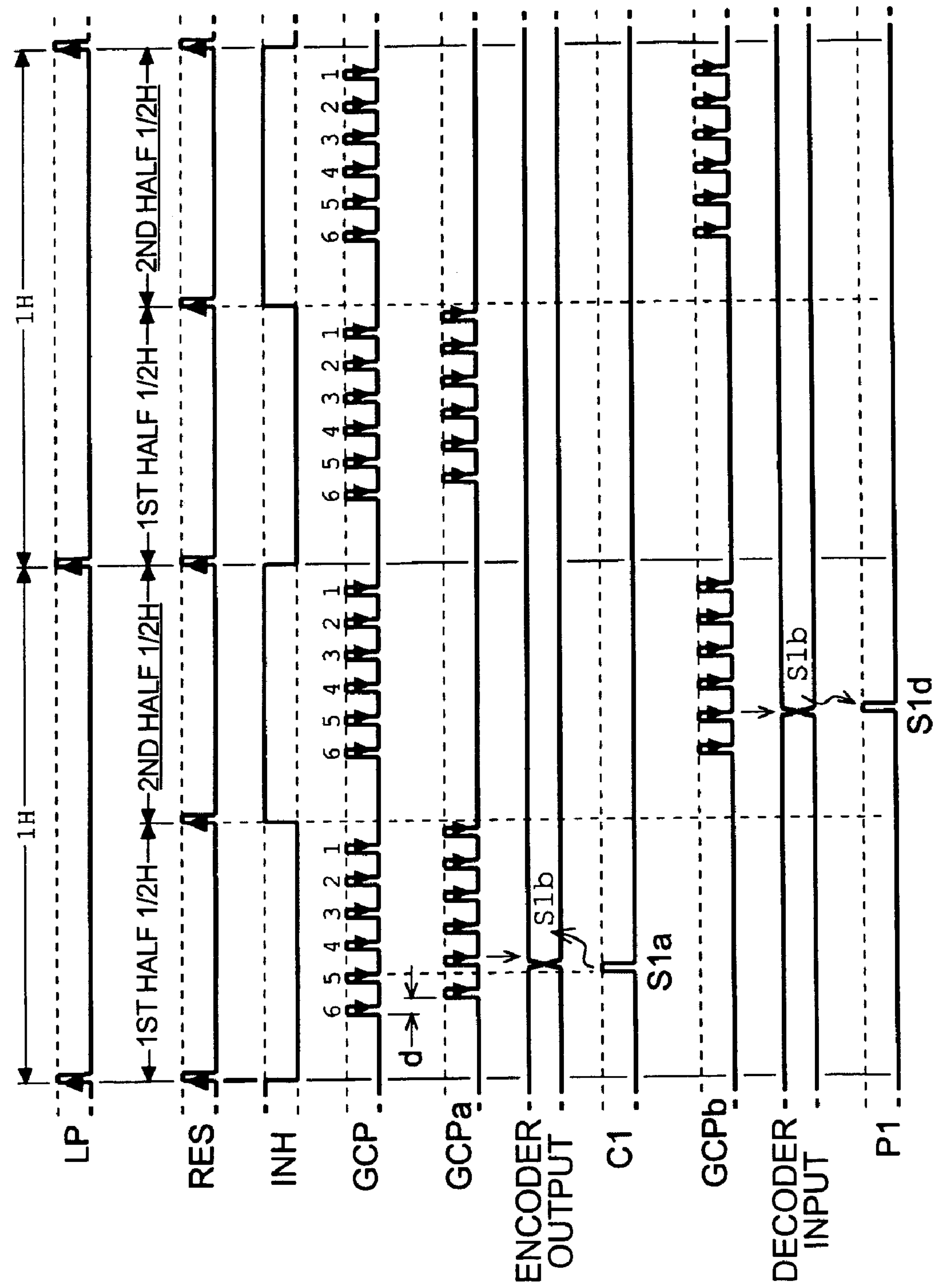
FIG. 16 is a timing chart for describing the operation of the same correction circuit.

The operation of the correction circuit 600 will now be described. FIGS. 15 and 16 are timing charts for describing the operation of the correction circuit 600.

As described above, the supply line 513 capacitively couples with the data lines 212 from the first column to the 240-th column, as with the scanning lines 312. For this reason, when a data line 212 switches from one of the voltages $+V_D/2$ and $-V_D/2$ to the other, a spike in the switching direction results in the relevant supply line 513 such that the spike is a level according to the number of data lines having the same relevant switching timing. At this time, the coupling capacitor 602 cuts off at $-V_D/2$, which is the DC component of the supply line 513, to let the spike pass as an AC component. Hence, the terminal in (refer to FIG. 13) is subjected to a spike with respect to the zero potential, as shown in FIG. 15. In details, when the data signal is switched from the voltage $-V_D/2$ to the voltage $+V_D/2$, the terminal in is subjected to a spike with positive polarity, whereas when the data signal is switched from the voltage $+V_D/2$ to the voltage $-V_D/2$, the terminal in is subjected to a spike with negative polarity. For this reason, the coupling capacitor 602 functions as a detection circuit for detecting a spike generated along with the voltage switching of the data signal.

The comparator 612 outputs the signal Cmp1 which goes to the H level when the voltage of the terminal in is above the threshold voltage Vth1. Hence, the comparator 612 replaces positive-polarity spikes whose voltages are above the threshold voltage Vth1 with pulses which go to the H level only while the voltages are above the threshold voltage Vth1, and then outputs the resultant pulses as the signal Cmp1. Similarly, the comparator 622 outputs the signal Cmp2 which goes to the H level when the threshold voltage Vth2 is above the voltage of the terminal in. Hence, the comparator 622 replaces negative-polarity spikes whose voltages are below the threshold voltage Vth2 with pulses which go to the H level only while the voltages are below the threshold voltage Vth1, and then outputs the resultant pulses as the signal Cmp2. In short, when a spike is above the absolute value of the threshold voltage Vth1 (Vth2), the comparator 612 (622) outputs the signal Cmp1 (Cmp2) which goes to the H level only while the signal Cmp1 (Cmp2) is above the absolute value of the threshold voltage Vth1 (Vth2).

Pulses which are included in the signal Cmp1 and are output with the start timing of one horizontal scanning period (1H) and in the second-half period (⁄1;2H) are eliminated by the eliminator 665, as shown in FIG. 15. Pulses included in the signal Cmp2 are also eliminated by another eliminator (not shown in the figure) in the same manner. Thus, the signal C1 (C2) output by the eliminator 665 is limited to pulses which are included in the signal Cmp1 (Cmp2) and output during the first-half period (except for the start timing) of one horizontal scanning period, as shown in FIG. 15.

Next, when a pulse occurs in the signal C1, the encoder 666 outputs encoded data indicating the width of the relevant pulse. As described above, when a spike occurs in the signal C1, a certain period of time is required until the pulse width is determined after the rising of the pulse. In FIG. 16, in the first-half period (⁄1;2H) of one horizontal scanning period, some degree of delay occurs after (the signal C1 rises and) the pulse S1*a* occurs until the encoded data S1*b* indicating the pulse width is output. In this figure, the pulse S1*a* is a pulse which has been generated as a result of the comparator 612 converting the spike S1 caused by the voltage switching of the data signal corresponding to the background gray, and has not been eliminated by the eliminator 665. Voltage switching of the data signal occurs at the trailing edge of the gradation code pulse GCP corresponding to gray, and ideally, the rise timing of the pulse S1*a* corresponds to the trailing timing of the relevant pulse. In practice, the comparators 612 and 622 are subjected to a delay in operation, and the timings of the two comparators do not correspond.

On the other hand, the control signal INH goes to the L level in the first-half period (⁄1;2H) of one horizontal scanning period. Hence, the output terminal A is selected in the selector 661, and the gradation code pulse GCPa is delayed by the time d with respect to the gradation code pulse GCP before it is output. Encoder data is written to the memory 667 with the trailing timing of this delayed gradation code pulse GCPa.

The write timing of the memory 667 is specified at the trailing edge of the delayed gradation code pulse GCP in this manner, because the comparators 612 and 622 are subjected to delay in operation, as described above, and some degree of delay occurs after the pulse S1*a* occurs until the encoded data S1*b* indicating the pulse width is output. In other words, if the write timing of the memory 667 were specified at the trailing edge of the gradation code pulse GCP corresponding to the occurrence of the pulse S1*a*, writing would be carried out with the width of the pulse S1*a* undetermined.

Then, the control signal INH goes to the H level in the second-half period (⁄1;2H) of one horizontal scanning period, the output terminal B is selected in the selector 661. Hence, the gradation code pulse GCP is output as the gradation code pulse GCPb, and encoded data written to the memory 667 is sequentially read out with the trailing timing of this gradation code pulse GCPb. The decoder 668 carries out decoding to a pulse with the width indicated by the relevant encoded data, only when the relevant encoded data is subjected to a change. Hence, for example, the pulse S1*a* of the signal C1 in the first-half period is delayed by approximately half (0.5H) the horizontal scanning period and is then output as the pulse S1*d* of the signal P, as shown in FIG. 15 or FIG. 16.

More specifically, the spike S1 generated as a result of the data signal in the first-half period being switched from the voltage $-V_D/2$ to the voltage $+V_D/2$ is replaced with the pulse S1*a* by the comparator 612, delayed, and then output as the positive-polarity pulse S1*d* with the timing when the voltage of the data signal switches from the voltage $+V_D/2$ to the voltage $-V_D/2$ in the second-half period.

Since the pulse S1*d* included in the signal P1 is output to the supply line 511 via the buffer 672 and the coupling capacitor 674, a positive polarity spike which is a differential waveform of the pulse S1*d* occurs in the relevant supply line 511.

As described above, the scanning-line drive circuit 350 turns ON the switch 3581 corresponding to the scanning line 312 selected during the second-half period and connects the supply line 511 to the relevant scanning line, so that a selection voltage with positive polarity is applied to the relevant scanning line. Thus, a positive polarity spike which is a differential waveform of the pulse S1*d* is superimposed, as-is, on the relevant scan signal.

In the relevant scanning line, the negative polarity spike S3 occurs with the timing when the data signal in the second-half period switches from the voltage $+V_D/2$ to the voltage $-V_D/2$. With the same timing as this, another spike with positive polarity also occurs. Consequently, both spikes cancel out each other, so that the selection voltage is maintained to be about $+V_S$.

Described above is an operation which is seen during one horizontal scanning period in which the polarity-indicating signal POL is the H level, i.e., during one horizontal scanning period including the second-half period in which the voltage $+V_S$ is applied as a selection voltage. Also, during the period in which the polarity-indicating signal POL is the L level, the selection voltage can be maintained to be about $-V_S$ by processing the pulse included in the signal P2 in the same manner.

In detail, in the second-half period of one horizontal scanning period in which the polarity-indicating signal POL is the H level, the data signal is switched from the voltage $-V_D/2$ to the voltage $+V_D/2$. Thus, a spike that occurs with that timing has a positive polarity. On the other hand, a pulse included in the signal P2 has a positive polarity, but this pulse is subjected to polarity inversion by the buffer 682 and is then output to the supply lines 514 via the coupling capacitor 684. Thus, a negative polarity spike, which is a differential waveform of the pulse, occurs in the relevant supply line 514. Consequently, both spikes cancel out each other also in the second-half period of the one horizontal scanning period in which the polarity-indicating signal POL is the H level, so that the selection voltage is maintained to be about $-V_S$.

In this correction circuit 600, a spike caused by the voltage switching of a data signal in the first-half period is replaced with a pulse with the width corresponding to the level of the spike, delayed by the memory 667, and added to the second-half period. This processing enables the spike to be canceled out regardless of the level of the spike.

Figure 17A:
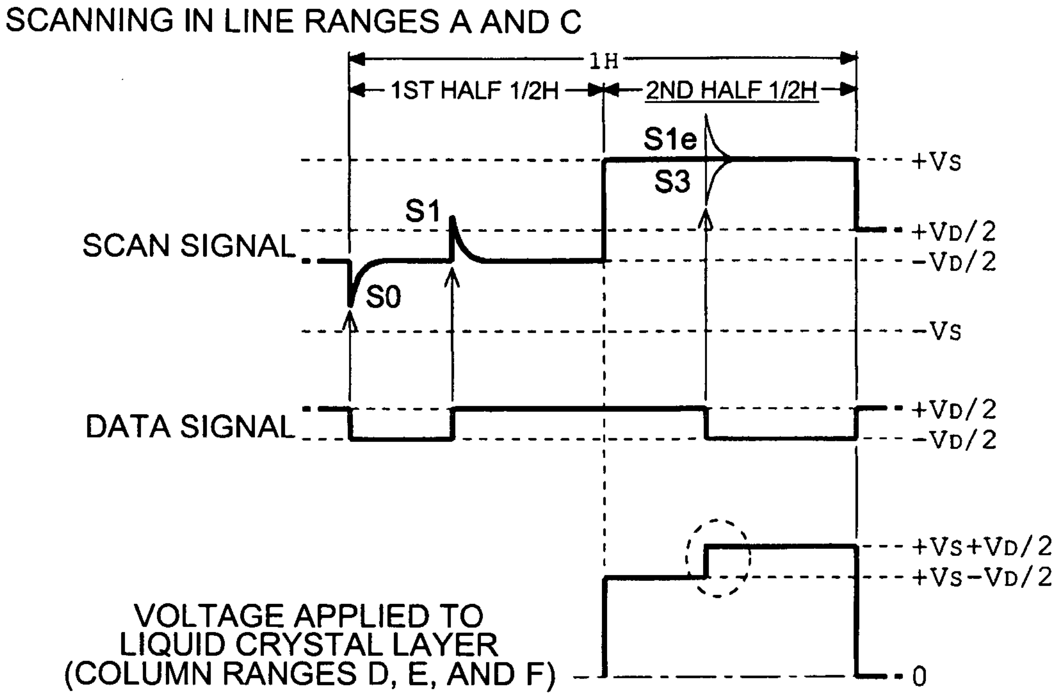
FIGS. 17A and B are diagrams for describing correction by the same correction circuit.
Figure 17B:
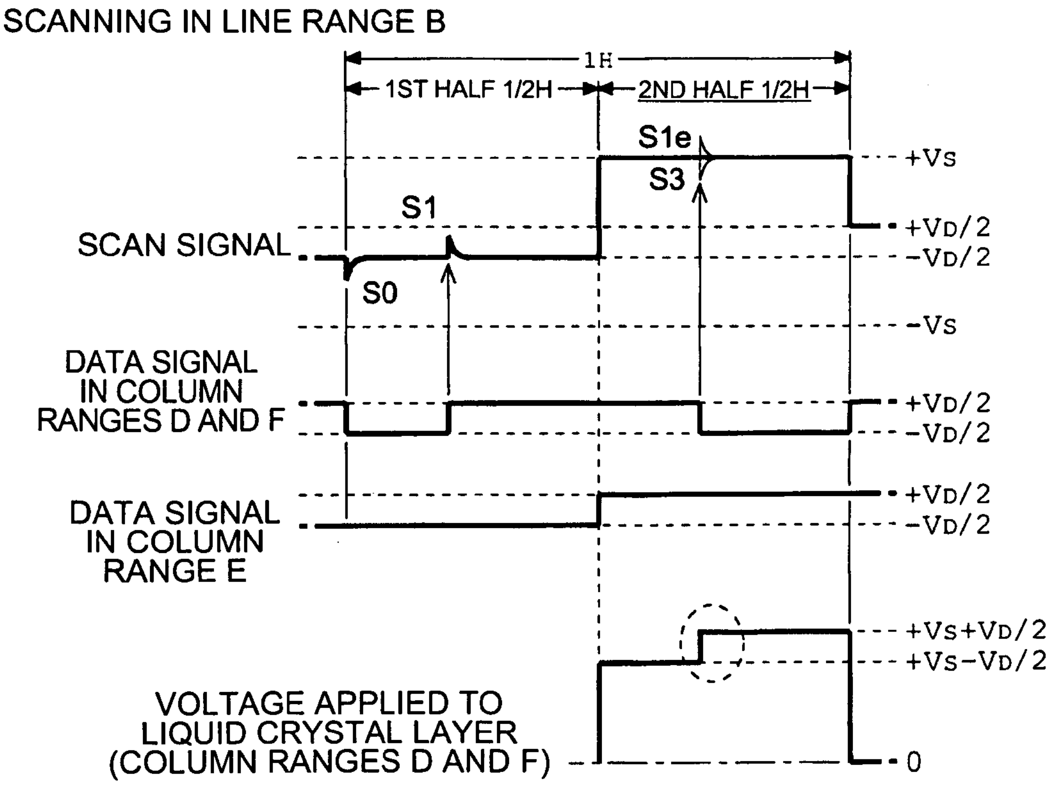

For example, in FIG. 12(*a*) described above, since the spike S1 occurring in the first-half period and the spike S3 occurring in second-half period are relatively large, the width of the pulse generated by converting the spike occurring in the first-half period is also large. Consequently, the width of the pulse included in the signal P1, which is an output, also becomes larger. For this reason, since a spike S1*e* superimposed on the scan signal also becomes large, as shown in FIG. 17(*a*), the selection voltage $+V_S$ of the scan signal is also maintained to be about constant. Consequently, the waveform of the voltage applied to pixels is substantially free from distortion.

In FIG. 12(*b*) described above, since the spike S1 occurring in the first-half period and the spike S3 occurring in second-half period are relatively small, the width of the pulse generated by converting the spike occurring in the first-half period is also small. Consequently, the width of the pulse included in the signal P1, which is an output, also becomes smaller.

For this reason, since the spike S1*e* superimposed on the scan signal also becomes small, as shown in FIG. 17(*b*), the selection voltage $+V_S$ of the scan signal is also maintained to be about constant. Consequently, the waveform of the voltage applied to pixels is substantially free from distortion. Thus, a voltage applied to the pixels in the areas A-D, A-E, A-F, C-D, C-E, and C-F is substantially equal to a voltage applied to the pixels in the areas B-D and B-F. That is, horizontal cross-talk can be substantially eliminated.

Furthermore, the voltages applied to pixels in these areas are substantially as intended, and therefore a display image substantially as intended can also be achieved, as shown in FIG. 11(*a*). In addition, even when the same level of gray is to be displayed on the entire screen, insufficient density does not result from a voltage applied to the pixels being insufficient.

As described above, according to this embodiment, a spike occurring in the first-half period is detected, and the detected spike is used to cancel out a spike occurring in the selection voltage in the second-half period. Consequently, since a high-speed operation is not required for the comparators 612 and 622 and other components, power consumption in such components can be reduced.

According to the embodiment, since a lighting voltage is applied at a later point in time when a selection voltage is applied, the data-line drive circuit 250 switches the data signal supplied to the data lines 212 from a non-lighting voltage to a lighting voltage in the selection-voltage application period. The present invention is not limited to this, however, and a lighting voltage may be applied at an earlier point in time. With this structure, in the selection-voltage application period, the data-line drive circuit 250 switches the data signal supplied to the data lines 212 from a lighting voltage to a non-lighting voltage, as opposed to the example of the above-described embodiment.

Furthermore, in the embodiment, the correction circuit 600 detects a spike of the supply lines 513, because the potential of the supply lines 513 is the potential of the grounding line Gnd, i.e., the ground potential, which is stable. Thus, as long as the potential is stable, other supply lines, wires, or other components may be used to detect a spike.

Although, in the above-described embodiment, the correction circuit 600 is a separate component independent of other components, the correction circuit 600 may be integrated with either or both of, for example, the data-line drive circuit 250 and the scanning-line drive circuit 350.

Although, in the above-described embodiment, the liquid crystal panel 100 has been described as an active matrix panel including TFDs 220 as active elements, the present invention is also applicable to a passive matrix liquid crystal panel where the liquid crystal 160 is held by intersecting stripe-shaped electrodes without using an active element.

The liquid crystal panel 100 is not limited to a transmissive-mode panel but is applicable to a reflective panel and a half-transmissive and half-reflective panel, which is a combination of transmissive features and reflective features. Furthermore, in the liquid crystal panel 100, the TFDs 220 are connected adjacent to the data lines 212 and the liquid crystal capacitances 118 are connected adjacent to the scanning lines 312. As opposed to this arrangement, however, the TFDs 220 may be connected adjacent to the scanning lines 312 and the liquid crystal capacitances 118 may be connected adjacent to the data lines 212.

Furthermore, the TFDs 220 are merely examples of two-terminal switching elements. Other elements using, for example, a ZnO (zinc oxide) varistor or an MSI (Metal Semi-Insulator) and components having two of these elements connected in series or in parallel in the opposite directions can be used as two-terminal switching elements.

Although the embodiment has been described by way of TN liquid crystal as the liquid crystal, STN liquid crystal and guest-host liquid crystal, in which dye (guest) whose absorption of visible light is anisotropic in the major-axis and minor-axis directions of molecules is dissolved in liquid crystal (host) with a constant alignment of molecules to arrange dye molecules in parallel to liquid crystal molecules, may be used. In addition, a vertical alignment (homeotropic alignment) structure, where liquid crystal molecules are aligned perpendicular to both the substrates while no voltage is applied whereas liquid crystal molecules are arranged in parallel to both the substrates while voltage is applied, may be employed. In contrast, a horizontal alignment (homogeneous alignment) structure, in which liquid crystal molecules are arranged in parallel to both the substrates while no voltage is applied whereas liquid crystal molecules are arranged perpendicular to both the substrates while voltage is applied, may be employed. As described above, according to the present invention, a wide variety of choices are possible for the liquid crystal and the alignment method as long as they are applicable to the drive technique. Furthermore, the present invention is applicable to electro-optical apparatuses, such as organic EL (electroluminescent) apparatuses, fluorescent display tubes, and plasma displays, in addition to the above-described liquid crystal devices.

Furthermore, the present invention is not limited to eight-gradation display but is applicable to display with fewer gradations, such as four, or with more gradations, for example, 16, 32, and 64. In addition, one dot may be composed of three pixels of R (red), G (green), and B (blue) for color display.

Figure 18:
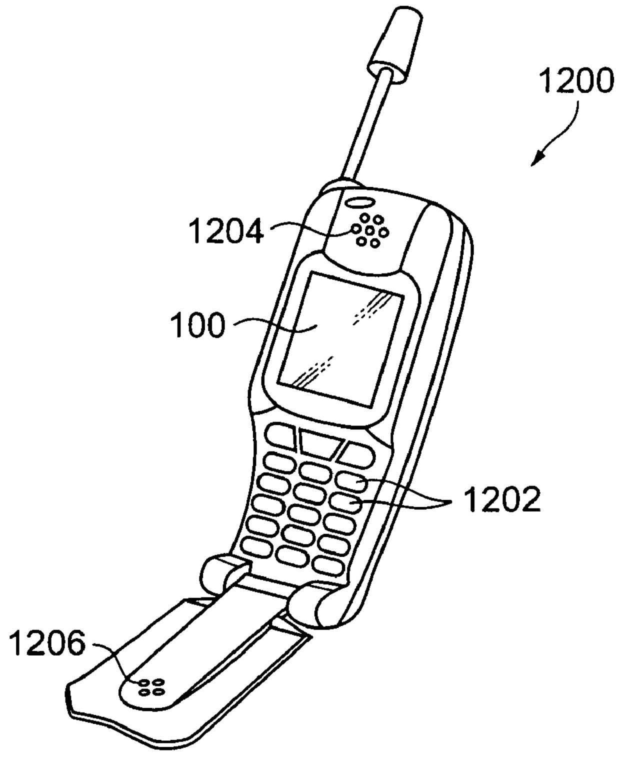
FIG. 18 is a perspective view showing the structure of a mobile phone including the same electro-optical apparatus.

An electronic apparatus having an electro-optical apparatus 10 according to the above-described embodiment as a display device will now be described. FIG. 18 is a perspective view showing the structure of a mobile phone 1200 including the electro-optical apparatus 10 according to an embodiment.

As shown in this figure, a mobile phone 1200 includes a plurality of operating buttons 1202, an earpiece 1204, a mouthpiece 1206, and the above-described liquid crystal panel 100. In the electro-optical apparatus 10, components other than the liquid crystal panel 100 are incorporated in the telephone, and are not visible from outside.

Figure 19:
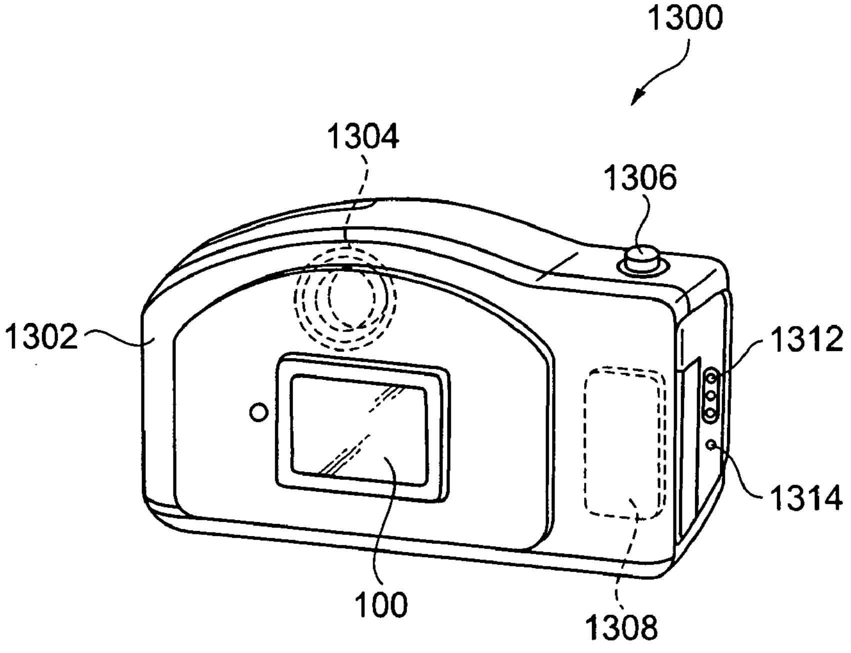
FIG. 19 is a perspective view showing the structure of a digital still camera including the same electro-optical apparatus.

FIG. 19 is a perspective view showing the structure of a digital still camera in which the liquid crystal panel 100 is applied to a viewfinder. While a film camera causes film to be exposed to an optical image of an object, a digital still camera 1300 carries out photoelectric conversion of an optical image of an object using an imaging element such as a CCD (Charge Coupled Device) to generate and store an imaging signal. Here, the above-described liquid crystal panel 100 is provided on the rear surface of a main body 1302 of the digital still camera 1300. This liquid crystal panel 100 performs display based on the imaging signal, and functions as a viewfinder for displaying an object. Furthermore, a photo acceptance unit 2304 including an optical lens and a CCD is provided on the front surface (rear surface in FIG. 19) of the main body 1302. When a photographer confirms an image of an object displayed on the liquid crystal panel 100 and presses a shutter button 1306, the imaging signal on the CCD at that time is transferred to and stored in a memory on a circuit board 1308.

Furthermore, on a lateral surface of a case 1302 of this digital still camera 1300, a video signal output terminal 1312 for external display and an input/output terminal 1314 for data communication are provided.

Electronic apparatuses to which the electro-optical apparatus 10 is applied include not only a mobile phone shown in FIG. 18 and a digital still camera shown in FIG. 19, but also a notebook computer, a liquid crystal television, a viewfinder (or monitor-direct-view) type video recorder, a car-navigation apparatus, a pager, an electronic notebook, a calculator, a word processor, a workstation, a video telephone, a POS terminal, devices including a touch panel, etc. The above-described electro-optical apparatus 10 is applicable as a display device for these various electronic apparatuses.

In all those electronic apparatuses, high-definition display substantially free from horizontal cross-talk can be achieved with a simple structure.

What is claimed is:

1. A cross-talk correction circuit of an electro-optical apparatus, the electro-optical apparatus including:
- pixels provided at intersections of a plurality of scanning lines and a plurality of data lines;
- a scanning-line drive circuit which sequentially selects the scanning lines every one horizontal scanning period and applies a selection voltage to a selected scanning line over a second-half period of the one horizontal scanning period; and
- a data-line drive circuit which:
  - applies a non-lighting voltage to one data line over a period according to the gradation of a pixel, the period being included in a first-half period in one horizontal scanning period;
  - applies a lighting voltage to the one data line over the rest of the first-half period;
  - applies a lighting voltage to the one data line over a period in the second-half period according to the gradation of the pixel; and
  - applies a non-lighting voltage to the one data line over the rest of the second-half period,
- the cross-talk correction circuit comprising:
  - a detection circuit which detects a spike resulting from switching from one of the lighting voltage and the non-lighting voltage to the other in a first-half period in one horizontal scanning period;
  - a determination circuit which determines whether the level of a detected spike is at least a threshold level; and an addition circuit which adds a pulse with the same polarity as that of the detected spike to the selection voltage in a second-half period following the first-half period if a determination is made by the determination circuit that the level of the detected spike is at least the threshold level.

2. The cross-talk correction circuit of an electro-optical apparatus according to claim 1, wherein the addition circuit adds the pulse at a time when the other of the lighting voltage and the non-lighting voltage is switched to the one in the second-half period.

3. The cross-talk correction circuit of an electro-optical apparatus according to claim 1, wherein:

the data-line drive circuit, in relation to one data line, makes a period from the start of the first-half period to the switching to the other of the lighting voltage and the non-lighting voltage substantially equal to a period from the start of the second-half period following the first half-period to the switching to the one of the lighting voltage and the non-lighting voltage, and the addition circuit includes a delay circuit which delays a spike having a level that is at least the threshold level by half of the one horizontal scanning period and outputs the delayed spike as the pulse.

4. The cross-talk correction circuit of an electro-optical apparatus according to claim 1, wherein:

the scanning-line drive circuit carries out polarity inversion of the selection voltage with respect to a voltage substantially intermediate between the lighting voltage and the non-lighting voltage, and includes two sets of the detection circuit, the determination circuit, and the addition circuit, one of the two sets being used for a positive polarity and the other of the two sets being used for a negative polarity.

5. The cross-talk correction circuit of an electro-optical apparatus according to claim 1, wherein:

the detection circuit includes a first capacitor having one end thereof connected to a predetermined voltage supply line.

6. The cross-talk correction circuit of an electro-optical apparatus according to claim 1, wherein:

the scanning-line drive circuit includes a switch that connects a power line for supplying the selection voltage to a selected scan electrode in the second-half period; and the addition circuit includes a second capacitor having one end thereof connected to the power line.

7. A cross-talk correction method for an electro-optical apparatus, the electro-optical apparatus including:

pixels provided at intersections of a plurality of scanning lines and a plurality of data lines;

a scanning-line drive circuit which sequentially selects the scanning lines every one horizontal scanning period and applies a selection voltage to a selected scanning line over a second-half period of the one horizontal scanning period; and a data-line drive circuit which:

applies a non-lighting voltage to one data line over a period according to the gradation of a pixel, the period being included in a first-half period in one horizontal scanning period;

applies a lighting voltage to the one data line over the rest of the first-half period;

applies a lighting voltage to the one data line over a period in the second-half period according to the gradation of the pixel; and applies a non-lighting voltage to the one data line over the rest of the second-half period;

the cross-talk correction method comprising:

detecting a spike resulting from switching from one of the lighting voltage and the non-lighting voltage to the other in a first-half period in one horizontal scanning period;

determining whether the level of a detected spike is at least a threshold level; and adding a pulse with the same polarity as that of the detected spike to the selection voltage in a second-half period following the first-half period if a determination is made that the level of the detected spike is at least the threshold level.

8. An electro-optical apparatus comprising:

pixels provided at intersections of a plurality of scanning lines and a plurality of data lines;

a scanning-line drive circuit which sequentially selects the scanning lines every one horizontal scanning period and applies a selection voltage to a selected scanning line over a second-half period of the one horizontal scanning period;

a data-line drive circuit which:

applies a non-lighting voltage to one data line over a period according to the gradation of a pixel, the period being included in a first-half period in one horizontal scanning period;

applies a lighting voltage to the one data line over the rest of the first-half period;

applies a lighting voltage to the one data line over a period in the second-half period according to the gradation of the pixel; and applies a non-lighting voltage to the one data line over the rest of the second-half period;

a detection circuit which detects a spike resulting from switching from one of the lighting voltage and the non-lighting voltage to the other in a first-half period in one horizontal scanning period;

a determination circuit which determines whether the level of a detected spike is at least a threshold level; and an addition circuit which adds a pulse with the same polarity as that of the detected spike to the selection voltage in a second-half period following the first-half period if a determination is made by the determination circuit that the level of the detected spike is at least the threshold level.

9. The electro-optical apparatus according to claim 8, wherein each of the pixels includes:

a two-terminal switching device having one end thereof connected to one of the corresponding scanning line and the corresponding data line; and an electro-optical capacitance having an electro-optic material held between the other of the corresponding scanning line and the corresponding data line and a pixel electrode connected to the other end of the two-terminal switching device.

10. An electronic apparatus comprising the electro-optical apparatus according to claim 8 as a display.

* * * * *